US011683210B2

United States Patent
Cha et al.

(10) Patent No.: US 11,683,210 B2
(45) Date of Patent: Jun. 20, 2023

(54) METHOD FOR TRANSMITTING/RECEIVING SIGNAL IN WIRELESS COMMUNICATION SYSTEM AND DEVICE SUPPORTING SAME

(71) Applicant: LG ELECTRONICS INC., Seoul (KR)

(72) Inventors: Hyunsu Cha, Seoul (KR); Sukhyon Yoon, Seoul (KR); Hyunsoo Ko, Seoul (KR); Byounghoon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/977,516

(22) Filed: Oct. 31, 2022

(65) Prior Publication Data

US 2023/0068270 A1    Mar. 2, 2023

Related U.S. Application Data

(63) Continuation of application No. 17/670,006, filed as application No. PCT/KR2020/010835 on Aug. 14, 2020, now Pat. No. 11,558,229.

(60) Provisional application No. 62/936,614, filed on Nov. 18, 2019.

(30) Foreign Application Priority Data

Aug. 14, 2019 (KR) .......... 10-2019-0099653
Sep. 30, 2019 (KR) .......... 10-2019-0120389

(51) Int. Cl.
*H04L 27/26* (2006.01)
*H04L 5/00* (2006.01)

(52) U.S. Cl.
CPC .......... *H04L 27/261* (2013.01); *H04L 5/0048* (2013.01)

(58) Field of Classification Search
CPC .............. H04L 27/261; H04L 27/2613; H04L 27/2657; H04L 5/0007; H04L 5/0048; H04L 5/0094; H04W 64/00
See application file for complete search history.

(56) References Cited

U.S. PATENT DOCUMENTS 11,558,229 B2 *  1/2023  Cha .................. H04L 27/261
2018/0217228 A1   8/2018  Edge et al.

FOREIGN PATENT DOCUMENTS

EP      3468267 A1    4/2019
KR   1020180016723 A  2/2018

OTHER PUBLICATIONS

Intel Corporation, "Design Aspects for NR DL Positioning", 3GPP TSG RAN WG1 Meeting #96, Feb. 25-Mar. 1, 2019, R1-1902511.
Intel Corporation, "Outcome of offline discussion #2 on AI 7.2.10. 1—DL Reference Signals for NR Positioning", 3GPP TSG RAN WG1 Meeting #97, May 13-17, 2019, R1-1907895.

(Continued)

*Primary Examiner* — Melvin C Marcelo
*Assistant Examiner* — Natali Pascual Peguero
(74) *Attorney, Agent, or Firm* — Dentons US LLP

(57) ABSTRACT

Various embodiments of the present disclosure relate to a next-generation wireless communication system for supporting a higher data transmission rate beyond a 4th generation (4G) wireless communication system. According to various embodiments of the present disclosure, a method for transmitting/receiving a signal in a wireless communication system and a device supporting same may be provided.

7 Claims, 28 Drawing Sheets

(56) References Cited

OTHER PUBLICATIONS

Mitsubishi Electric, "Views on DL reference signal designs for NR positioning", 3GPP TSG RAN WG1 Meeting #98, Aug. 26-30, 2019, R1-1908118.
Intel Corporation, "Design of Downlink Reference Signals for NR Positioning", 3GPP TSG RAN WG1 Meeting #97, Reno, USA, May 13-17, 2019, R1-1906821.
CATT, "DL Reference Signals for NR Positioning", 3GPP TSG RAN WG1 #97, Reno, USA, May 13-17, 2019, R1-1906305.
MediaTek Inc., "DL RS design for NR positioning", 3GPP TSG-RAN WG1 #97 Meeting, Reno, USA, May 13-17, 2019, R1-1906561.
Erricson, "DL Reference Signals for NR Positioning", 3GPP TSG RAN WG1 Meeting #97, Reno, NV, USA, May 13-17, 2019, R1-1907508.
Erricson, "DL and UL Reference Signals for NR Positioning", 3GPP TSG RAN WG1 96, Xi'an, China, Apr. 8-12, 2019, R1-1905481.
Ericson, "DL and UL Reference Signals for NR Positioning", 3 GPP TSG RAN WG1 96, Apr. 8-12, 2019, R1-1905461.

\* cited by examiner

FIG. 7
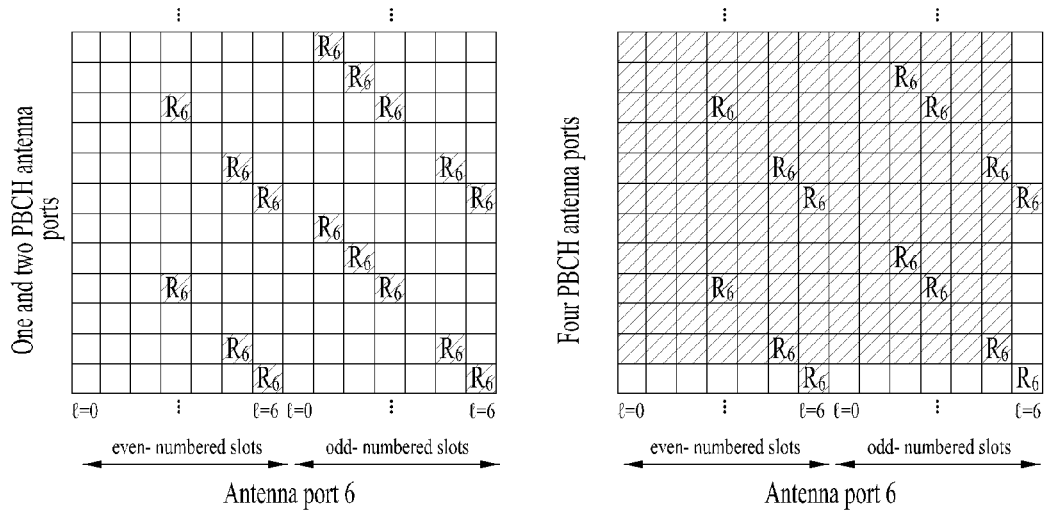
(a)
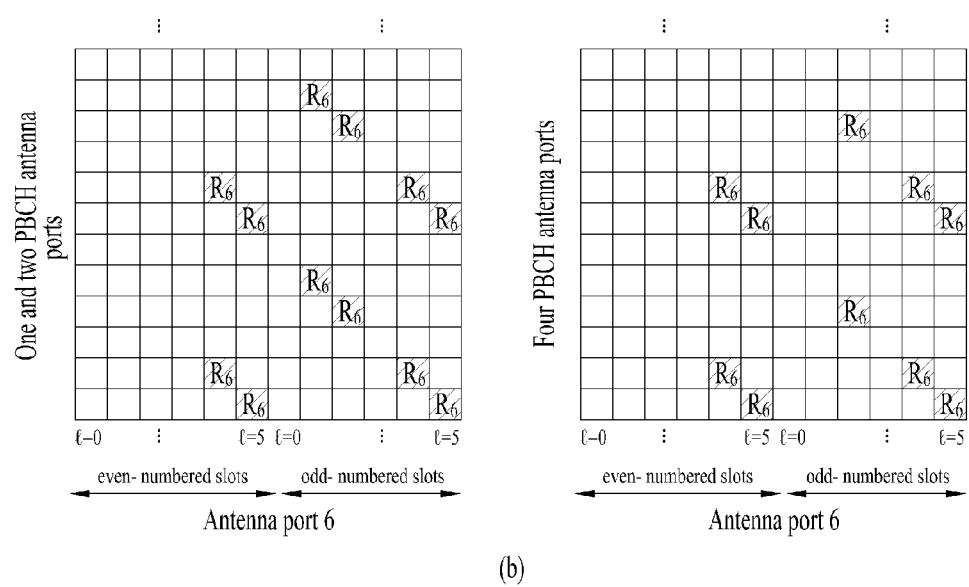
(b)

FIG. 13
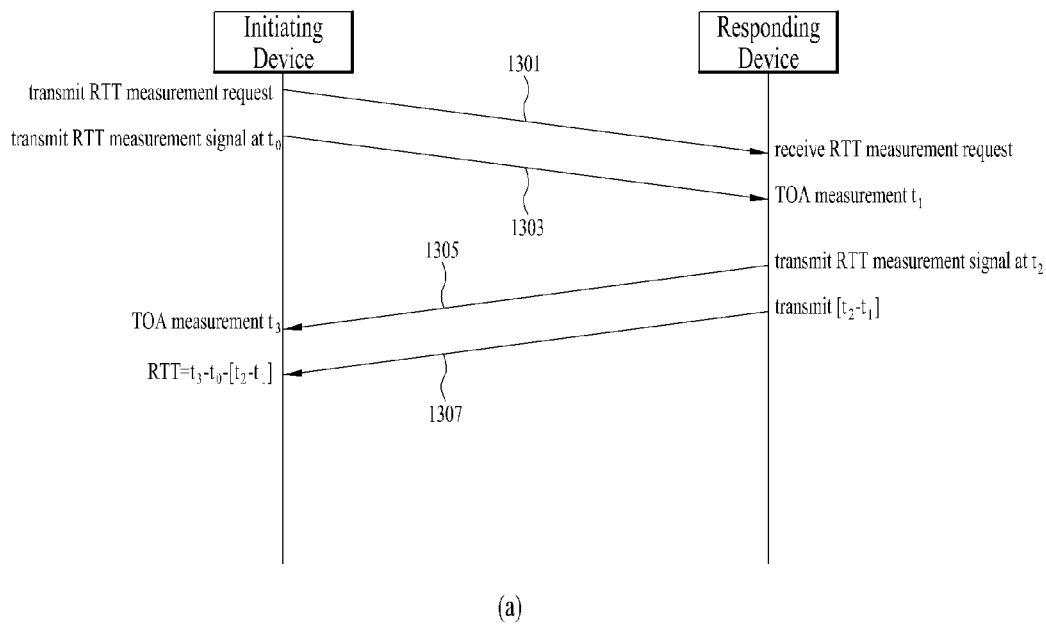
(a)
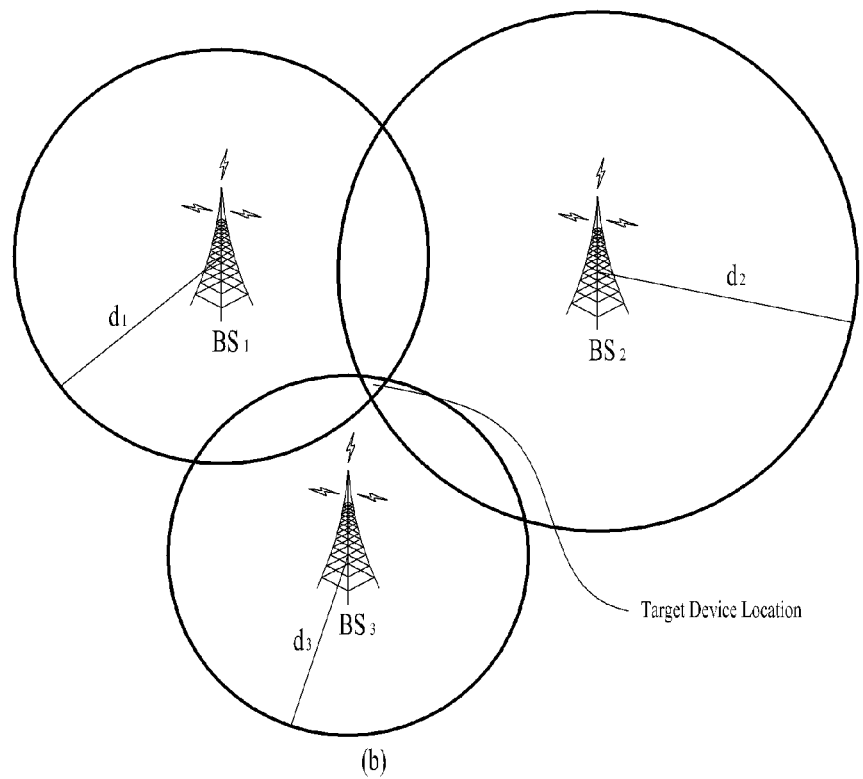
(b)

METHOD FOR TRANSMITTING/RECEIVING SIGNAL IN WIRELESS COMMUNICATION SYSTEM AND DEVICE SUPPORTING SAME

CROSS-REFERENCE TO RELATED APPLICATIONS

This application is a Continuation of U.S. patent application Ser. No. 17/670,006, filed on Feb. 11, 2022, which is a Continuation Bypass of International Application No. PCT/KR2020/010835, filed on Aug. 14, 2020, which claims the benefit of U.S. Provisional Application No. 62/936,614, filed on Nov. 18, 2019, and Korean Patent Application Nos. 10-2019-0099653, filed on Aug. 14, 2019, and 10-2019-0120389, filed on Sep. 30, 2019, the contents of which are all hereby incorporated by reference herein in their entirety.

TECHNICAL FIELD

Various embodiments of the present disclosure relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments of the present disclosure may provide a positioning method in a wireless communication system and apparatus for supporting the same.

Various embodiments of the present disclosure may provide a method of indicating a configuration of a reference signal (RS) for positioning in a wireless communication system and apparatus for supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments of the present disclosure may provide a method of transmitting and receiving a signal in a wireless communication system and apparatus for supporting the same.

According to various embodiments of the present disclosure, a method performed by a user equipment (UE) in a wireless communication system may be provided.

In an exemplary embodiment, the method may include: receiving information related to a positioning reference signal (PRS) resource configuration; and receiving a PRS mapped to a plurality of resource elements (REs) configured as a comb in a frequency domain based on the PRS resource configuration, In an exemplary embodiment, the plurality of REs may be obtained based on (i) information on a first offset included in the PRS resource configuration, (ii) a predetermined second offset, and (iii) a comb size of the comb, In an exemplary embodiment, the second offset may include a frequency offset for each of one or more orthogonal frequency division multiplexing (OFDM) symbols occupied by the plurality of REs among OFDM symbols included in one slot, In an exemplary embodiment, (i) the frequency offset for each of the one or more OFDM symbols, (ii) an index for each of the one or more OFDM symbols, and (iii) the comb size may satisfy a predetermined corresponding relation.

In an exemplary embodiment, starting indices of the plurality of REs in each of the one or more OFDM symbols may be obtained based on a remainder obtained by dividing a sum of the first offset and the frequency offset by the comb size.

In an exemplary embodiment, the first offset may be one frequency offset applied to all of the one or more OFDM symbols.

In an exemplary embodiment, the comb size may be indicated as one of a plurality of predetermined candidate values.

In an exemplary embodiment, the plurality of predetermined candidate values may be 2, 4, 6, or 12.

In an exemplary embodiment, a frequency offset for a first OFDM symbol among the one or more OFDM symbols may be 0.

In an exemplary embodiment, the method may further include receiving information related to assistance data for the PRS.

In an exemplary embodiment, information on the comb size may be included in the assistance data.

In an exemplary embodiment, based on that the comb size is 4 and a number of the one or more OFDM symbols is 4, (i) a frequency offset for a first OFDM symbol among the four OFDM symbols may be 0; (ii) a frequency offset for a second OFDM symbol among the four OFDM symbols may be 2; (iii) a frequency offset for a third OFDM symbol among the four OFDM symbols may be 1; and (iv) a frequency offset for a fourth OFDM symbol among the four OFDM symbols may be 3.

In an exemplary embodiment, based on that the comb size is 8 and a number of the one or more OFDM symbols is 8, (i) a frequency offset for a first OFDM symbol among the 8 OFDM symbols may be 0; (ii) a frequency offset for a second OFDM symbol among the 8 OFDM symbols may be 4; (iii) a frequency offset for a third OFDM symbol among the 8 OFDM symbols may be 2; (iv) a frequency offset for a fourth OFDM symbol among the 8 OFDM symbols may be 6; (v) a frequency offset for a fifth OFDM symbol among the 8 OFDM symbols may be 1; (vi) a frequency offset for a sixth OFDM symbol among the 8 OFDM symbols may be 5; (vii) a frequency offset for a seventh OFDM symbol among the eight OFDM symbols may be 3; and (viii) a frequency offset of an eighth OFDM symbol among the eight OFDM symbols may be 7.

In an exemplary embodiment, based on that the comb size is 16 and a number of the one or more OFDM symbols is 16, (i) a frequency offset for a first OFDM symbol among the 16

OFDM symbols may be 0; (ii) a frequency offset for a second OFDM symbol among the 16 OFDM symbols may be 8; (iii) a frequency offset for a third OFDM symbol among the 16 OFDM symbols may be 4; (iv) a frequency offset for a fourth OFDM symbol among the 16 OFDM symbols may be 12; (v) a frequency offset for a fifth OFDM symbol among the 16 OFDM symbols may be 2; (vi) a frequency offset for a sixth OFDM symbol among the 16 OFDM symbols may be 10; (vii) the frequency offset for a seventh OFDM symbol among the 16 OFDM symbols may be 6; (viii) a frequency offset for an eighth OFDM symbol among the 16 OFDM symbols may be 14; (ix) a frequency offset for a ninth OFDM symbol among the 16 OFDM symbols may be 1; (x) a frequency offset for a tenth OFDM symbol among the 16 OFDM symbols may be 9; (xi) a frequency offset for an eleventh OFDM symbol among the 16 OFDM symbols may be 5; (xii) a frequency offset for a twelfth OFDM symbol among the 16 OFDM symbols may be 13; (xiii) a frequency offset for a thirteenth OFDM symbol among the 16 OFDM symbols may be 3; (xiv) a frequency offset for a fourteenth OFDM symbol among the 16 OFDM symbols may be 11; (xv) a frequency offset for a fifteenth OFDM symbol among the 16 OFDM symbols may be 7; and (xvi) a frequency offset for a sixteenth OFDM symbol among the 16 OFDM symbols may be 15

According to various embodiments of the present disclosure, an apparatus configured to operate in a wireless communication system may be provided.

In an exemplary embodiment, the apparatus may include: a memory; and one or more processors coupled with the memory.

In an exemplary embodiment, the one or more processors may be configured to: receive information related to a PRS resource configuration; and receive a PRS mapped to a plurality of REs configured as a comb in a frequency domain based on the PRS resource configuration, In an exemplary embodiment, the plurality of REs may be obtained based on (i) information on a first offset included in the PRS resource configuration, (ii) a predetermined second offset, and (iii) a comb size of the comb, In an exemplary embodiment, the apparatus may communicate with at least one of a mobile terminal, a network, or an autonomous driving vehicle other than a vehicle including the apparatus.

According to various embodiments of the present disclosure, a method performed by an apparatus in a wireless communication system may be provided.

In an exemplary embodiment, the method may include: transmitting information related to a PRS resource configuration; and transmitting a PRS mapped to a plurality of REs configured as a comb in a frequency domain based on the PRS resource configuration.

In an exemplary embodiment, the plurality of REs may be obtained based on (i) information on a first offset included in the PRS resource configuration, (ii) a predetermined second offset, and (iii) a comb size of the comb, In an exemplary embodiment, the second offset may include a frequency offset for each of one or more OFDM symbols occupied by the plurality of REs among OFDM symbols included in one slot, In an exemplary embodiment, (i) the frequency offset for each of the one or more OFDM symbols, (ii) an index for each of the one or more OFDM symbols, and (iii) the comb size may satisfy a predetermined corresponding relation.

According to various embodiments of the present disclosure, an apparatus configured to operate in a wireless communication system may be provided.

In an exemplary embodiment, the apparatus may include: a memory; and one or more processors coupled with the memory.

In an exemplary embodiment, the one or more processors may be configured to: transmit information related to a PRS resource configuration; and transmit a PRS mapped to a plurality of REs configured as a comb in a frequency domain based on the PRS resource configuration.

In an exemplary embodiment, the plurality of REs may be obtained based on (i) information on a first offset included in the PRS resource configuration, (ii) a predetermined second offset, and (iii) a comb size of the comb, In an exemplary embodiment, the second offset may include a frequency offset for each of one or more OFDM symbols occupied by the plurality of REs among OFDM symbols included in one slot.

In an exemplary embodiment, (i) the frequency offset for each of the one or more OFDM symbols, (ii) an index for each of the one or more OFDM symbols, and (iii) the comb size may satisfy a predetermined corresponding relation.

According to various embodiments of the present disclosure, an apparatus configured to operate in a wireless communication system may be provided.

In an exemplary embodiment, the apparatus may include: one or more processors; and one or more memories configured to store one or more instructions that cause the one or more processors to perform a method.

In an exemplary embodiment, the method may include: receiving information related to a PRS resource configuration; and receiving a PRS mapped to a plurality of REs configured as a comb in a frequency domain based on the PRS resource configuration.

In an exemplary embodiment, the plurality of REs may be obtained based on (i) information on a first offset included in the PRS resource configuration, (ii) a predetermined second offset, and (iii) a comb size of the comb, In an exemplary embodiment, the second offset may include a frequency offset for each of one or more OFDM symbols occupied by the plurality of REs among OFDM symbols included in one slot.

In an exemplary embodiment, (i) the frequency offset for each of the one or more OFDM symbols, (ii) an index for each of the one or more OFDM symbols, and (iii) the comb size may satisfy a predetermined corresponding relation.

According to various embodiments of the present disclosure, a processor-readable medium configured to store one or more instructions that cause one or more processors to perform a method may be provided.

In an exemplary embodiment, the method may include: receiving information related to a PRS resource configuration; and receiving a PRS mapped to a plurality of REs configured as a comb in a frequency domain based on the PRS resource configuration.

In an exemplary embodiment, the plurality of REs may be obtained based on (i) information on a first offset included in the PRS resource configuration, (ii) a predetermined second offset, and (iii) a comb size of the comb, In an exemplary embodiment, the second offset may include a frequency offset for each of one or more OFDM symbols occupied by the plurality of REs among OFDM symbols included in one slot.

In an exemplary embodiment, (i) the frequency offset for each of the one or more OFDM symbols, (ii) an index for each of the one or more OFDM symbols, and (iii) the comb size may satisfy a predetermined corresponding relation.

Various embodiments as described above are only some of preferred embodiments of the various embodiments, and those skilled in the art may derive and understand many embodiments in which technical features of the various embodiments are reflected based on the following detailed description.

Advantageous Effects

According to various embodiments of the present disclosure, a method of transmitting and receiving a signal in a wireless communication system and apparatus for supporting the same may be provided.

According to various embodiments of the present disclosure, a positioning method in a wireless communication system and apparatus for supporting the same may be provided.

According to various embodiments of the present disclosure, signaling overhead of indicating a configuration of a reference signal (RS) for positioning in a wireless communication system may be reduced.

For example, according to various embodiments of the present disclosure, RS resources for positioning may be effectively configured in a staggered resource element (RE) pattern, so that positioning may be efficiently performed.

For example, according to various embodiments of the present disclosure, when RS resources for positioning are configured in a staggered RE pattern and/or a comb, among an offset value commonly applied to all orthogonal frequency division multiplexing (OFDM) symbols occupied by the RS resources and an offset value separately applied to each of all the OFDM symbols occupied by the RS resource, only the commonly applied offset value may be signaled, and the separately applied offset value may be obtained/identified by a predetermined functional relationship or a predetermined corresponding relation without separate signaling, thereby reducing signaling overhead.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

FIG. 7 illustrates exemplary mapping of a positioning reference signal (PRS) in a long term evolution (LTE) system to which various embodiments of the present disclosure are applicable.

FIG. 13 is a diagram illustrating a multi-round trip time (multi-RTT) positioning method to which various embodiments are applicable.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
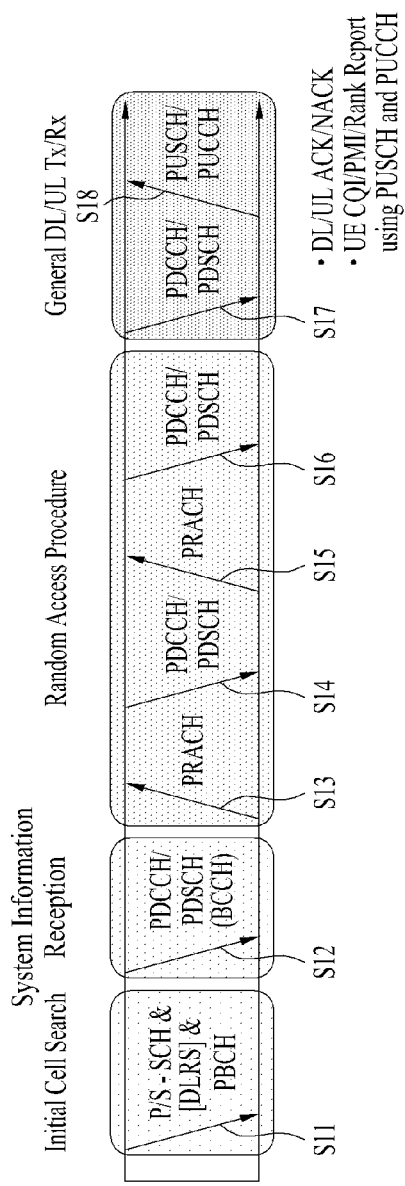
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS.

Thereafter, the UE may receive a physical broadcast channel (PBCH) signal from the BS to obtain information broadcast in the cell.

The UE may check a downlink channel state by receiving a downlink reference signal (DL RS) during the initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, S13/S15 may be performed as one operation in which the UE performs transmission, and S14/S16 may be performed as one operation in which the BS performs transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
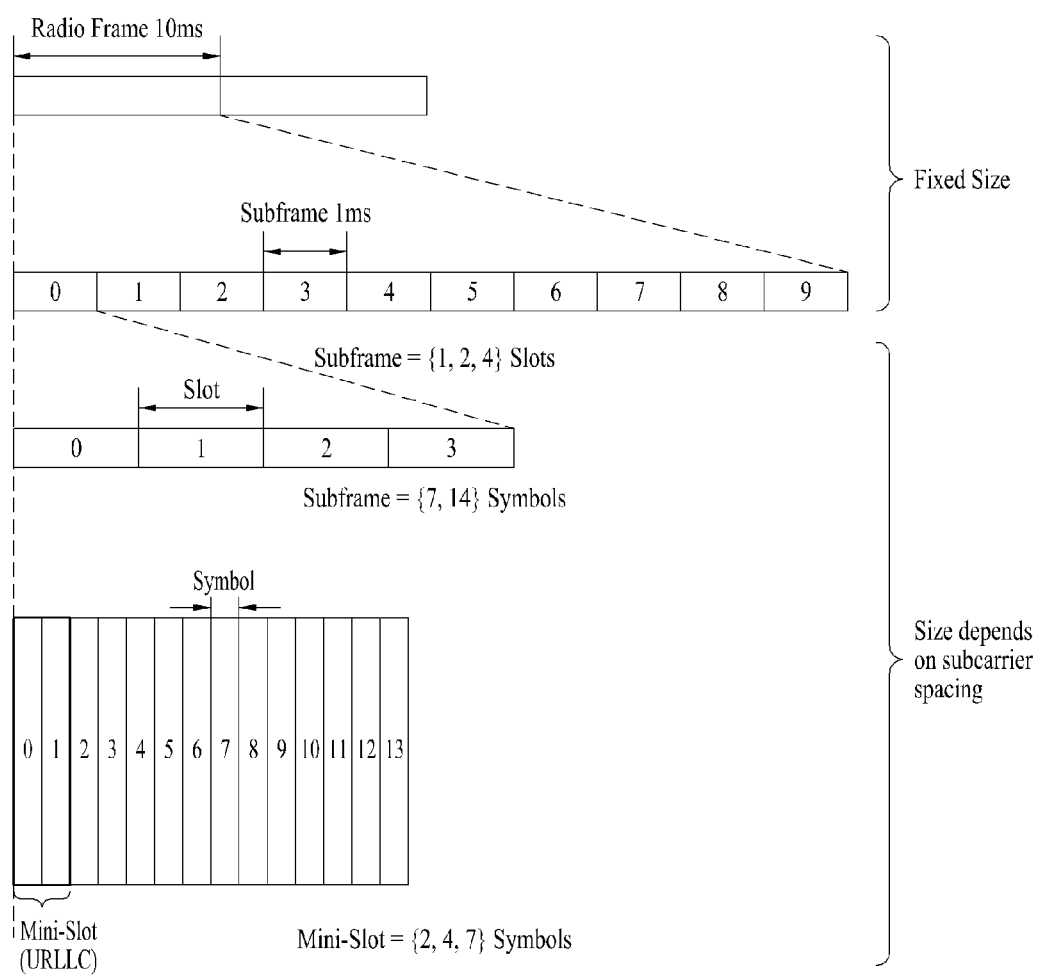
FIG. 2 is a diagram illustrating a resource grid in a new radio (NR) system to which various embodiments are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or p). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, p and a CP are obtained from RRC parameters provided by the BS.

TABLE 1

| μ | $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology u, slots are numbered with $n^\mu_s \in \{0, \ldots, N^{slot,\mu}_{subframe}-1\}$ in an increasing order in a subframe, and with $n^\mu_{s,f} \in \{0, \ldots, N^{slot,\mu}_{frame}-1\}$ in an increasing order in a radio frame. One slot includes $N^\mu_{symb}$ consecutive OFDM symbols, and $N^\mu_{symb}$ depends on a CP. The start of a slot $n^\mu_s$ in a subframe is aligned in time with the start of an OFDM symbol $n^\mu_s*N^\mu_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |

TABLE 3-continued

| μ | $N^{slot}_{symb}$ | $N^{frame,\mu}_{slot}$ | $N^{subframe,\mu}_{slot}$ |
|---|---|---|---|
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI)(generically referred to as a time unit (TU), for convenience) may be configured differently for the aggregated cells.

FIG. 2 illustrates an example with μ=2 (i.e., an SCS of 60 kHz), in which referring to Table 3, one subframe may include four slots. One subframe={1, 2, 4} slots in FIG. 2, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
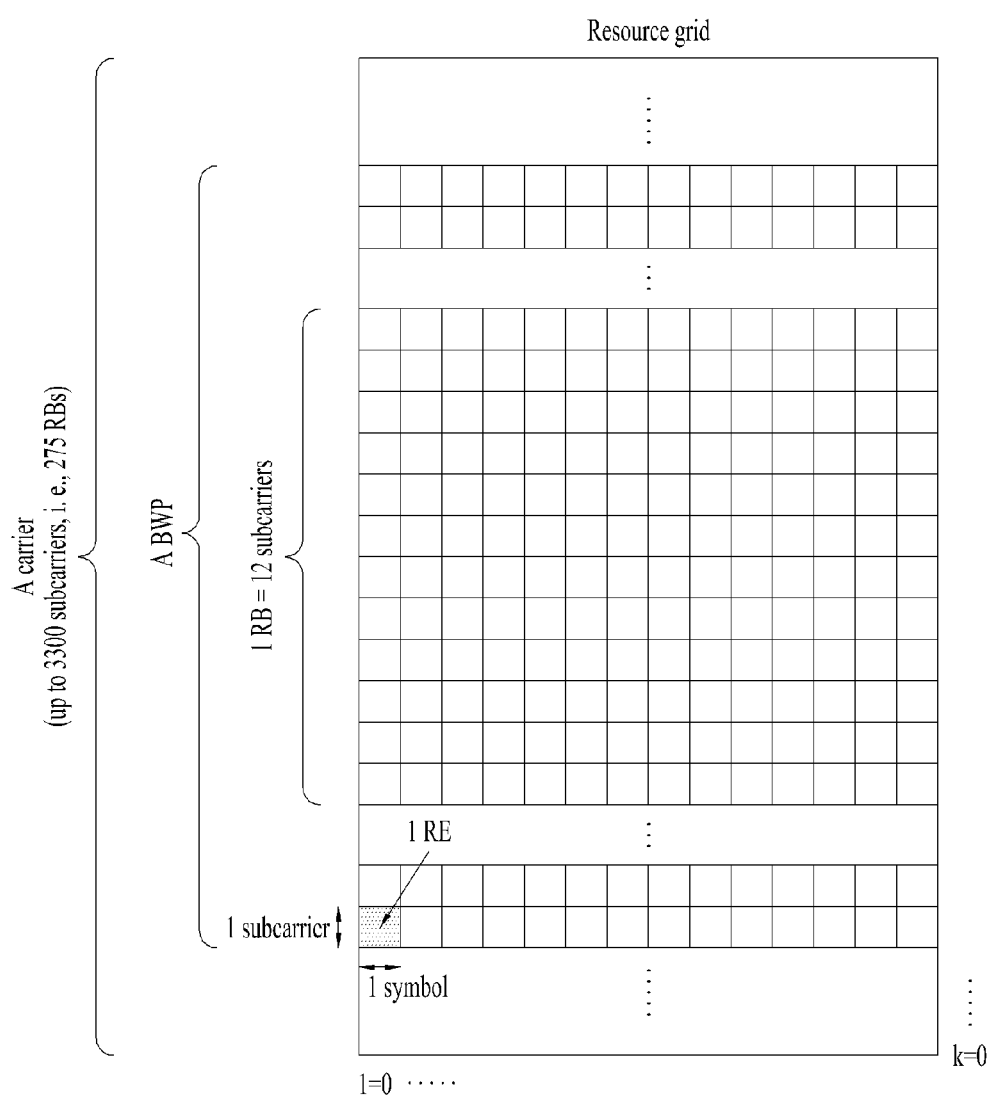
FIG. 3 is a diagram illustrating mapping of physical channels in a slot, to which various embodiments are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
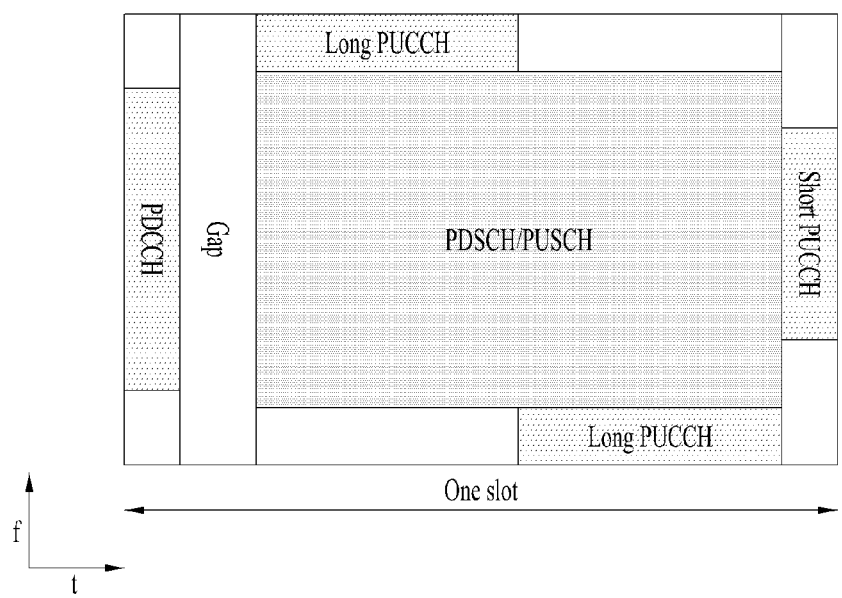
FIG. 4 is a diagram illustrating an example of mapping physical channels to a slot to which various embodiments of the present disclosure are applicable.

FIG. 4 is a diagram illustrating an example of mapping physical channels to a slot to which various embodiments of the present disclosure are applicable.

DL control channel(s), DL or UL data, and UL control channel(s) may all be included in one slot. For example, the first N symbols (hereinafter, referred to as a DL control region) of the slot may be used to transmit a DL control channel, and the last M symbols (hereinafter, referred to as a UL control region) of the slot may be used to transmit a UL control channel. N and M are each an integer greater than or equal to 0. A resource region (hereinafter, referred to as a data region) between the DL control region and the UL control region may be used for DL data transmission or UL data transmission. A time gap for DL-to-UL or UL-to-DL switching may exist between the control region and the data region. A PDCCH may be transmitted in the DL control region, and a PDSCH may be transmitted in the DL data region. Some symbols at the time of switching from DL to UL in the slot may be used as a time gap.

1.3. Channel Structures 1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. QCL (Quasi Co-located or Quasi Co-Location)

An antenna port may be defined such that a channel that carries a symbol on the antenna port is inferred from a channel that carries another symbol on the same antenna port. When the properties of a channel carrying a symbol on an antenna port are inferred from a channel carrying a symbol on another antenna port, the two antenna ports may be said to be in the quasi co-located or quasi co-location (QC/QCL) relationship.

The channel properties may include at least one of the following factors: delay spread, Doppler spread, frequency/Doppler shift, average received power, and received timing/average delay, or spatial receive (RX) parameter. Here, the spatial Rx parameter refers to a spatial (RX) channel property parameter such as angle of arrival.

In order for the UE to decode a PDSCH based on a detected PDCCH with DCI intended for the corresponding UE and a given serving cell, a list of up to M TCI-state configurations may be configured by the higher layer parameter PDSCH-Config, where M depends on UE capability.

Each TCI-state includes parameters for establishing a QCL relationship between one or two DL RSs and DMRS ports of the PDSCH.

The QCL relationship is configured by the higher layer parameter qcl-Type1 for a first DL RS and the higher layer parameter qcl-Type2 for a second DL RS (if configured). For the two DL RSs, the QCL types may not be the same, regardless of whether the RSs are the same DL RS or different DL RSs.

The UE may receive a list of up to M TCI-state configurations to decode a PDSCH based on a detected PDCCH with DCI intended for the UE and a given cell. Here, M depends on UE capability.

Each TCI-state includes parameters for establishing a QCL relationship between one or two DL RSs and DMRS ports of the PDSCH. The QCL relationship is configured by the following RRC parameters: qcl-Type1 for the first DL RS and qcl-Type2 (if configured) for the second DL RS.

The QCL type of each DL RS is given by a parameter 'qcl-Type' in QCL-Info and have one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if the target antenna port is a specific non-zero power (NZP) CSI-RS, corresponding NZP CSI-RS antenna ports may be indicated/configured to be QCL with a specific tracking reference signal (TRS) in terms of QCL-Type A and QCL with a specific SSB in terms of QCL-Type D. Upon receiving the above indication/configuration, the UE may receive the corresponding NZP CSI-RS based on Doppler and delay values measured on the QCL-TypeA TRS and apply a reception beam used to receive the QCL-TypeD SSB to the reception of the corresponding NZP CSI-RS.

The UE may receive an activation command used to map up to 8 TCI states to the code point of the DCI field 'Transmission Configuration Indication' through medium access control (MAC) control element (CE) signaling.

1.5. UL-DL Timing Relationship

Figure 5:
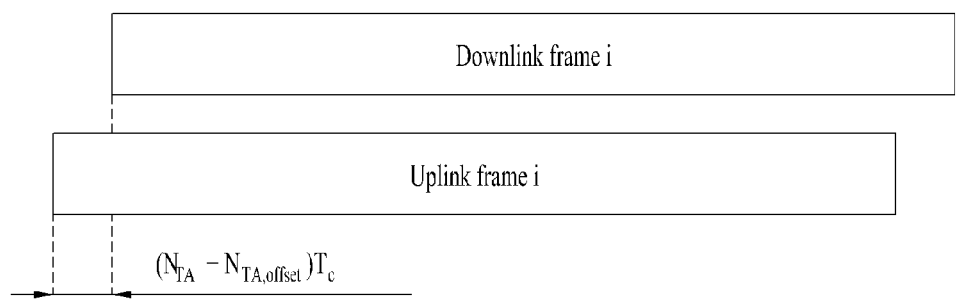
FIG. 5 is a diagram illustrating an exemplary UL-DL timing relationship, which is applicable to various embodiments of the present disclosure.

FIG. 5 is a diagram illustrating an exemplary UL-DL timing relationship applicable to various embodiments of the present disclosure.

Referring to FIG. 5, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_T A$ values by index values of $T_A=0, 1, 2, \ldots, 3846$, where an amount of the time alignment for a TAG with an SCS of $2^\mu*15$ kHz is $N_{TA}$ (=$T_A*16*64/2^\mu$). $N_{TA}$ is relative to the SCS of a first UL transmission from the UE after reception of a random access response.

In other cases, a TA command, $T_A$ for a TAG indicates adjustment of a current $N_T A$ value, $N_{TA\_old}$ to a new $N_{TA}$ value, $N_{TA\_new}$ by index values of $T_A$ (=0, 1, 2, ..., 63), where for a SCS of $2^\mu*15$ kHz, $N_{TA\_new}=N_{TA\_old}+(T_A-31)*16*64/2^\mu$.

2. Positioning

Positioning may be a process of determining the geographical location and/or speed of a UE based on the measurement of a radio signal. A client (e.g., application) related to the UE may request location information, and the location information may be reported to the client. The location information may be included in a core network or requested by the client connected to the core network. The location information may be reported in a standard format such as cell-based or geographical coordinates. Herein, an estimation error of the location and speed of the UE and/or a positioning method used for the positioning may also be reported.

2.1. Positioning Protocol Configuration

Figure 6:
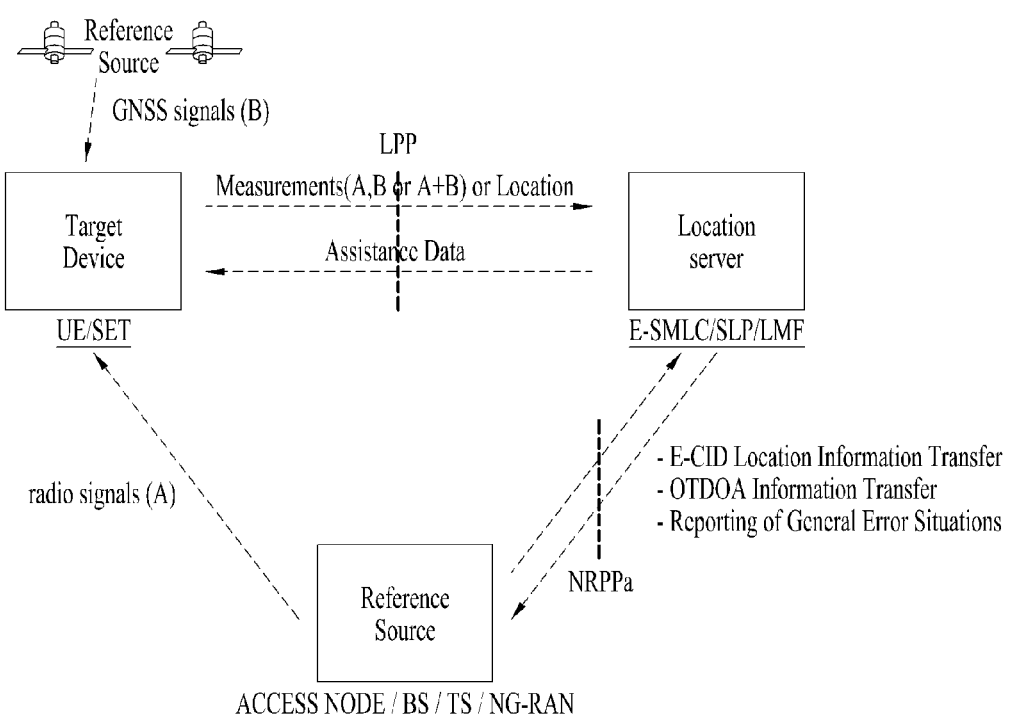
FIG. 6 is a diagram illustrating an exemplary positioning protocol configuration for user equipment (UE) positioning, which is applicable to various embodiments of the present disclosure.

FIG. 6 is a diagram illustrating an exemplary positioning protocol configuration for UE positioning, to which various embodiments of the present disclosure are applicable.

Referring to FIG. 6, an LTE positioning protocol (LPP) may be used as a point-to-point protocol between a location server (E-SMLC and/or SLP and/or LMF) and a target device (UE and/or SET) in order to position a target device based on positioning-related measurements obtained from one or more reference sources. The target device and the location server may exchange measurements and/or location information based on signal A and/or signal B through the LPP.

NR positioning protocol A (NRPPa) may be used for exchanging information between a reference source (access node and/or BS and/or TP and/or NG-RAN node) and a location server.

NRPPa may provide the following functions:

E-CID Location Information Transfer. This function allows exchange of location information between a reference source and an LMF, for the purpose of E-CID positioning.

OTDOA Information Transfer. This function allows exchange of information between the reference source and the LMF for the purpose of OTDOA positioning.

Reporting of General Error Situations. This function allows reporting of general error situations, for which function specific error messages have not been defined.

2.2. PRS in LTE System

For such positioning, a positioning reference signal (PRS) may be used. The PRS is a reference signal used to estimate the position of the UE.

For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as subframe #0. If only MBSFN subframes are configured as the positioning subframes within a cell, OFDM symbols configured for the PRS in the MBSFN subframes may have an extended CP.

The sequence of the PRS may be defined by Equation 1 below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0,1, \ldots, 2N_{RB}^{max,DL} - 1$$

In Equation 1, n, denotes a slot number in a radio frame and l denotes an OFDM symbol number in a slot. $N_{RB}^{max,DL}$ is the largest of DL bandwidth configurations, expressed as $N_{SC}^{RB}$. $N_{SC}^{RB}$ denotes the size of an RB in the frequency domain, for example, 12 subcarriers.

c(i) denotes a pseudo-random sequence and may be initialized by Equation 2 below.

$$c_{init}=2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1)+2 \cdot (N_{ID}^{PRS} \bmod 512)+N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 11:
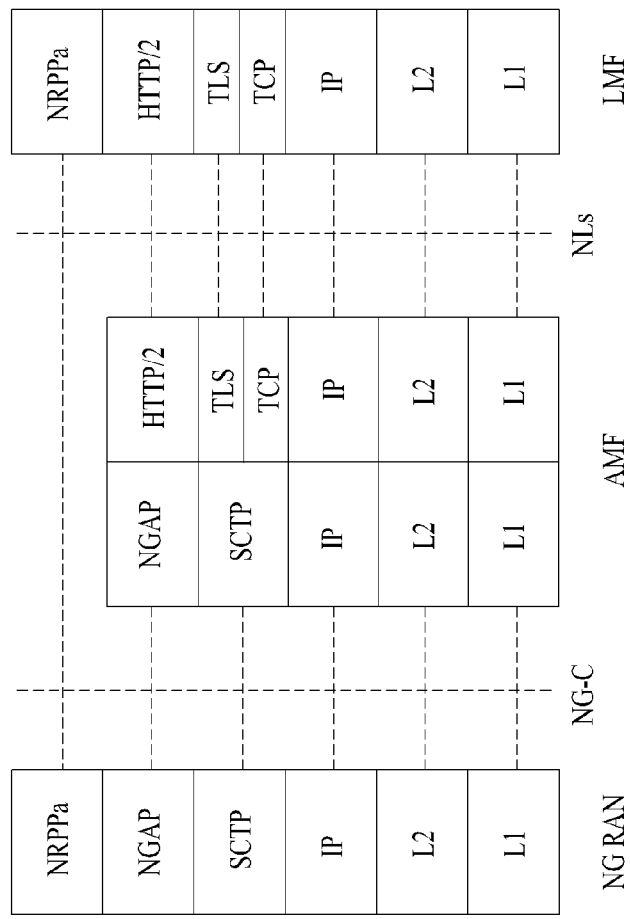
FIG. 11 is a diagram illustrating protocol layers for supporting NR positioning protocol A (NRPPa) protocol data unit (PDU) transmission, to which various embodiments are applicable.

FIG. 11 illustrates an exemplary pattern to which a PRS is mapped in a subframe.

As illustrated in FIG. 11, the PRS may be transmitted through an antenna port 6. FIG. 11(a) illustrates mapping of the PRS in the normal CP and FIG. 11(b) illustrates mapping of the PRS in the extended CP.

The PRS may be transmitted inconsecutive subframes grouped for position estimation. The subframes grouped for position estimation are referred to as a positioning occasion. The positioning occasion may consist of 1, 2, 4 or 6 subframe. The positioning occasion may occur periodically with a periodicity of 160, 320, 640 or 1280 subframes. A cell-specific subframe offset value may be defined to indicate the starting subframe of PRS transmission. The offset value and the periodicity of the positioning occasion for PRS transmission may be derived from a PRS configuration index as listed in Table 11 below.

TABLE 5

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-2399 | 1280 | $I_{PRS}$ − 1120 |
| 2400-2404 | 5 | $I_{PRS}$ − 2400 |
| 2405-2414 | 10 | $I_{PRS}$ − 2405 |
| 2415-2434 | 20 | $I_{PRS}$ − 2415 |
| 2435-2474 | 40 | $I_{PRS}$ − 2435 |
| 2475-2554 | 80 | $I_{PRS}$ − 2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed as a low-interference subframe so that no data is transmitted in the positioning subframe. Therefore, the PRS is not subjected to interference due to data transmission although the PRS may interfere with PRSs of other cells.

2.3. UE Positioning Architecture in NR System

Figure 8:
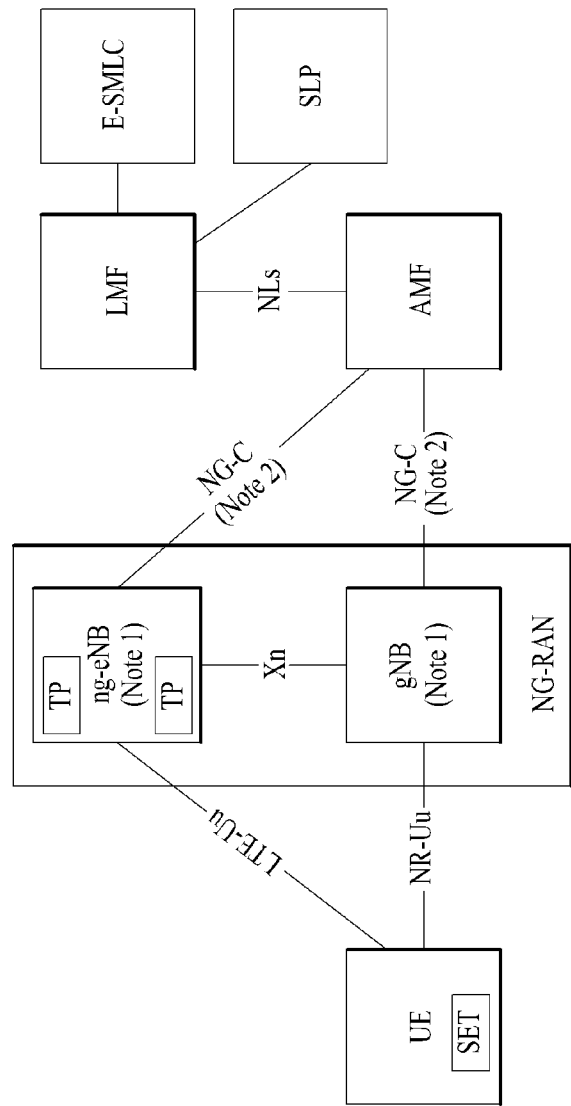
FIG. 8 is a diagram illustrating an example of an architecture of a system for positioning a UE, to which various embodiments of the present disclosure are applicable.

FIG. 8 illustrates architecture of a 5G system applicable to positioning of a UE connected to an NG-RAN or an E-UTRAN.

Referring to FIG. 8, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 9:
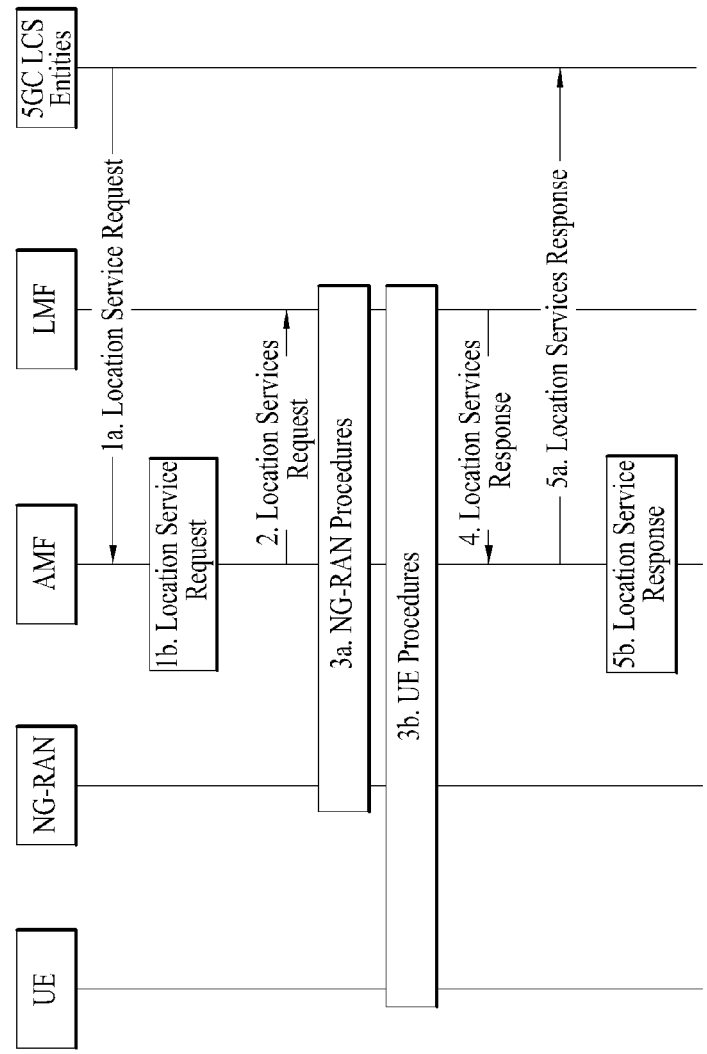
FIG. 9 is a diagram illustrating an example of a procedure of positioning a UE, to which various embodiments of the present disclosure are applicable.

FIG. 9 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 9. In other words, in FIG. 9 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 9. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 9 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol 2.5.1. LTE Positioning Protocol (LPP)

Figure 10:
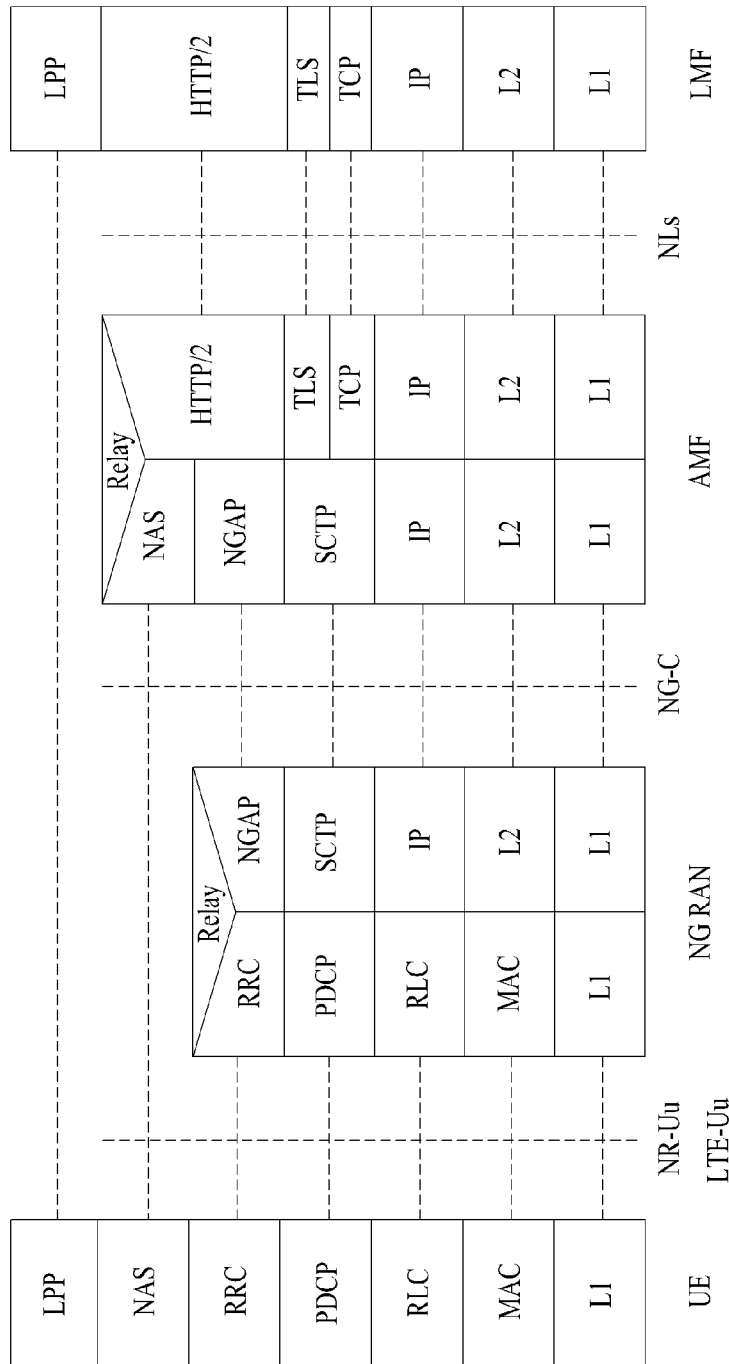
FIG. 10 is a diagram illustrating protocol layers for supporting LTE positioning protocol (LPP) message transmission, to which various embodiments are applicable.

FIG. 10 illustrates an exemplary protocol layer used to support LPP message transfer between an LMF and a UE. An LPP protocol data unit (PDU) may be carried in a NAS PDU between an AMF and the UE.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

2.5.2. NR Positioning Protocol A (NRPPa)

FIG. 11 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

2.6.1. OTDOA (Observed Time Difference of Arrival)

Figure 12:
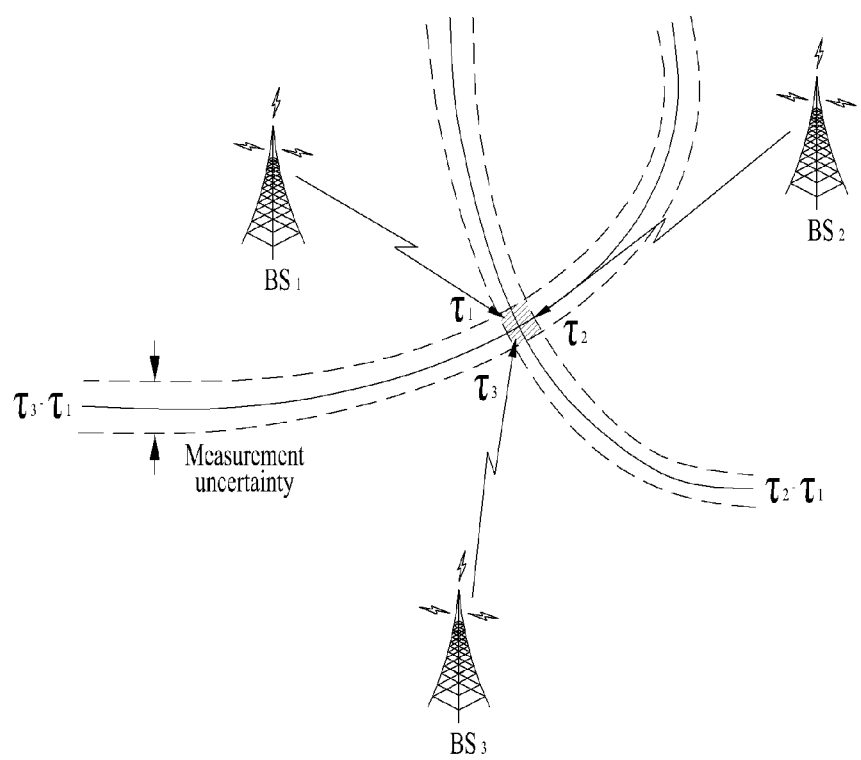
FIG. 12 is a diagram illustrating an observed time difference of arrival (OTDOA) positioning method, to which various embodiments are applicable.

FIG. 12 is a diagram illustrating an observed time difference of arrival (OTDOA) positioning method, to which various embodiments are applicable;

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 3 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$ [Equation 3]

In Equation 3, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

2.6.2. E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance ($T_{ADV}$), and/or AoA Here, $T_{ADV}$ may be divided into Type 1 and Type 2 as follows.

T_ADV Type 1=(ng-eNB Rx-Tx time difference)+(UE E-UTRA Rx-Tx time difference)

T_ADV Type 2=ng-eNB Rx-Tx time difference

AoA may be used to measure the direction of the UE. AoA is defined as the estimated angle of the UE counterclockwise from the eNBfTP. In this case, a geographical reference direction may be north. The eNBinP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

2.6.3. UTDOA (Uplink Time Difference of Arrival)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

2.6.4. Multi RTT (Multi-Cell RTT)

Compared to OTDOA positioning requiring fine synchronization (e.g., at the nano-second level) between TPs in the network, RTT positioning requires only coarse timing TRP (e.g., BS) synchronization although it is based on TOA measurements like OTDOA positioning.

FIG. 13 is a diagram illustrating an exemplary multi-RTT positioning method to which various embodiments of the present disclosure are applicable.

Referring to FIG. 13(a), an RTT process is illustrated, in which an initiating device and a responding device perform TOA measurement, and the responding device provides a TOA measurement to the initiating device, for RTT measurement (calculation). For example, the initiating device may be a TRP and/or a UE, and the responding device may be a UE and/or a TRP.

In operation 1701 according to an exemplary embodiment, the initiating device may transmit an RTT measurement request, and the responding device may receive the RTT measurement request.

In operation 1703 according to an exemplary embodiment, the initiating device may transmit an RTT measurement signal at time $t_0$, and the responding device may obtain TOA measurement $t_1$.

In operation 1705 according to an exemplary embodiment, the responding device may transmit an RTT measurement signal at time $t_2$, and the initiating device may obtain TOA measurement $t_3$.

In operation 1707 according to an exemplary embodiment, the responding device may transmit information about $[t_2-t_1]$, and the initiating device may receive the corresponding information and calculate an RTT based on Equation 4 below. The corresponding information may be transmitted and received by a separate signal or in the RTT measurement signal of operation 1705.

$$RTT = t_3 - t_0 - [t_2 - t_1] \qquad \text{[Equation 4]}$$

Referring to FIG. 13(b), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

3. Various Embodiments of the Present Disclosure

Various embodiments of the present disclosure will be described below in detail based on the above-described technical idea. Clause 1 and clause 2 may be applied to the various embodiments of the present disclosure. For example, operations, functions, and terms which are not defined in the various embodiments of the present disclosure may be performed and described based on clause 1 and clause 2.

Symbol/abbreviations/terms used in the following description of various embodiments of the present disclosure are described below.

A/B/C: A and/or B and/or C

CSI-RS: channel state information reference signal

Comb: A comb may refer to a method of mapping signals at regular intervals in the frequency domain. For example, comb 2 (comb-2 or 2-comb) may mean mapping the same specific RS to each RE spaced by two subcarriers. Comb 4 (comb-4 or 4-comb) may mean mapping the same specific RS to each RE spaced by four subcarriers.

Frequency RE offset and comb offset: In the description of various embodiments of the present disclosure, a frequency RE pattern of a PRS resource may refer to how frequency subcarrier REs (frequency REs or subcarriers) are used in a specific single OFDM symbol occupied by the PRS resource. For example, multiple adjacent frequency subcarrier REs (frequency REs or subcarriers) may be used, or multiple irregular subcarrier REs (frequency REs or subcarriers) may be used. In this case, a frequency RE pattern in which one frequency subcarrier RE (frequency RE or subcarrier) is used for every predetermined number of frequency subcarrier REs (frequency REs or subcarriers) may be a comb-type frequency RE pattern, which may also be called a comb pattern. A frequency RE offset for a specific symbol of the PRS resource may mean which frequency subcarrier RE (frequency RE or subcarrier) is used with respect to a specific subcarrier index. A comb offset may mean the frequency RE offset of the comb pattern when the frequency RE pattern is the comb pattern. In the description of various embodiments of the present disclosure, when the comb pattern is used as the frequency RE pattern of a PRS, the comb offset may be used in the same meaning as the frequency RE offset.

LMF: location management function

Mod: Mod denotes a modular operation (modulo arithmetic or modulo operation). For example, the modular operation is an operation to obtain remainder r obtained by dividing dividend q by divisor d (r=q mod (d)).

OFDM: orthogonal frequency division multiplexing

PCID: physical cell ID (identifier)

PRB: physical resource block

PRS: positioning reference signal

QCL: quasi-colocation

RB: resource block

RE: resource element

RS: reference signal

SRS: sounding reference signal

SS: synchronization signal

SSB: synchronization signal block

SS/PBCH: synchronization signal/physical broadcast channel

TRP: transmission reception point (TP: transmission point)

In the description of various embodiments of the present disclosure, the term BS is to be understood as an umbrella term including a remote radio head (RRH), eNB, gNB, TP, reception point (RP), relay, etc.

In the description of various embodiments of the present disclosure, when it is said that something is more than/more than or equal to A, it may be interpreted to mean that A is more than or equal to/more than A.

In the description of various embodiments of the present disclosure, when it is said that something is less than/less than or equal to B, it may be interpreted to mean that the thing is less than or equal to/less than B.

Various embodiments of the present disclosure may relate to a method of effectively configuring/measuring a frequency RE offset value for each symbol of an RS (e.g., PRS) resource used for UE positioning and apparatus for supporting the same.

In the following description of various embodiments of the present disclosure, an RS mainly refers to a PRS, but the RS may include various RSs including, for example, a CSI-RS, an SSB, and the like.

In the description of various embodiments of the present disclosure, an RS (e.g., PRS) resource set may include one or more RS resources. The identity of the RS resource set may be defined by the ID (identifier)/index assigned to the RS resource set. A specific RS resource set may be configured in association with a specific cell/TP/BS.

For example, assuming that RS resource set 1={0, 1, 2, 3} and RS resource set 2={0, 1, 2, 3} (in this example, the elements of each set are RS resources (IDs)), each set has the same RS resources (IDs). Thus, RS resources may not be identified only by information on the RS resources (IDs), so that information on RS resource sets (IDs) may need to be provided together. As another example, if RS resources are capable of being identified by one of the RS resource sets (IDs) or the RS resources (IDs), either information on the corresponding RS resource sets (IDs) or information on the RS resources (IDs) may be provided.

Various embodiments of the present disclosure may be related to PRS frequency RE offset configurations.

For example, a DL PRS resource may be defined by one or more of the following parameters:

A DL PRS resource ID;
A sequence ID;
A comb size of N (N is a natural number);
An RE offset in the frequency domain (for example, single and/or multiple values may be used as the offset);
A starting slot and/or symbol of the DL PRS resource (for example, whether the starting slot and/or symbol is indicated as a time offset with respect to a predetermined reference may be determined);
The number of symbols per DL PRS resource (the duration of the DL PRS resource);
QCL information (QCL with other DL RSs (for example, the other DL RSs may be an SSB, a CSI-RS, or another PRS, and various QCL types may be used);
The number of TX ports;
A power offset between a DL PRS and an SSB;
A transmission bandwidth and a starting PRB for point A; and
A numerology.

For example, one or more of the above parameters may be included in a resource set configuration, and whether the parameter(s) are applied to all resources in the resource set may be determined.

For example, the number of symbols for the DL PRS resource may be configured in a set of {1, 2, 3, 4, 6, 8, 12}.

For example, the comb-N value of the DL PRS resource may be configured in a set of {1, 2, 4, 6, 8, 12}.

For example, the values in the set for the parameters may be determined by considering the dependency between the number of symbols and the comb size.

For example, a staggered RE pattern may be supported as the RE pattern of a PRS used for UE positioning in the NR system.

First, PRS resources with the staggered RE pattern will be described. Each OFDM symbol (of the PRS resource) may have a comb-N type frequency RE pattern. That is, each OFDM symbol may have a frequency RE pattern where one RE is occupied for every N frequency REs. For example, in the staggered RE pattern, this comb-N RE pattern is used over several symbols, and the comb offset (e.g., frequency RE offset) varies for each symbol. Thus, from the viewpoint of one PRS resource configured over multiple symbols, various frequency REs may be used for every symbol instead of occupying only specific frequency REs.

For example, in the staggered RE pattern of a PRS, the frequency-domain RE pattern of each OFDM symbol may have a comb size of N for one PRS resource occupying N OFDM symbol (where N is a natural number greater than 1). In addition, the comb offset (e.g., frequency-domain RE offset) may vary for each OFDM symbol. Accordingly, all and/or some of the subcarriers in an RB may be occupied by the PRS REs of the PRS resource.

In the LTE system, the number and positions of symbols in which the PRS is configured are fixed. In addition, since the comb-N pattern is fixed to have a comb size of 6, a total of 6 cells/TPs/BSs may use frequency resources in one symbol by orthogonally dividing the frequency resources. To this end, simply, a frequency RE offset (e.g., comb offset) may be uniformly configured/indicated for all symbols in which the PRS is configured, depending on the remainder obtained by dividing a TP ID or PCID by 6.

However, in the NR system, since one or more PRS resources may be configured/indicated in one cell/TP/BS and the number and positions of symbols in which each PRS resource is configured may also vary, it may be difficult to employ the method used in the LTE system as it is.

Figure 14:
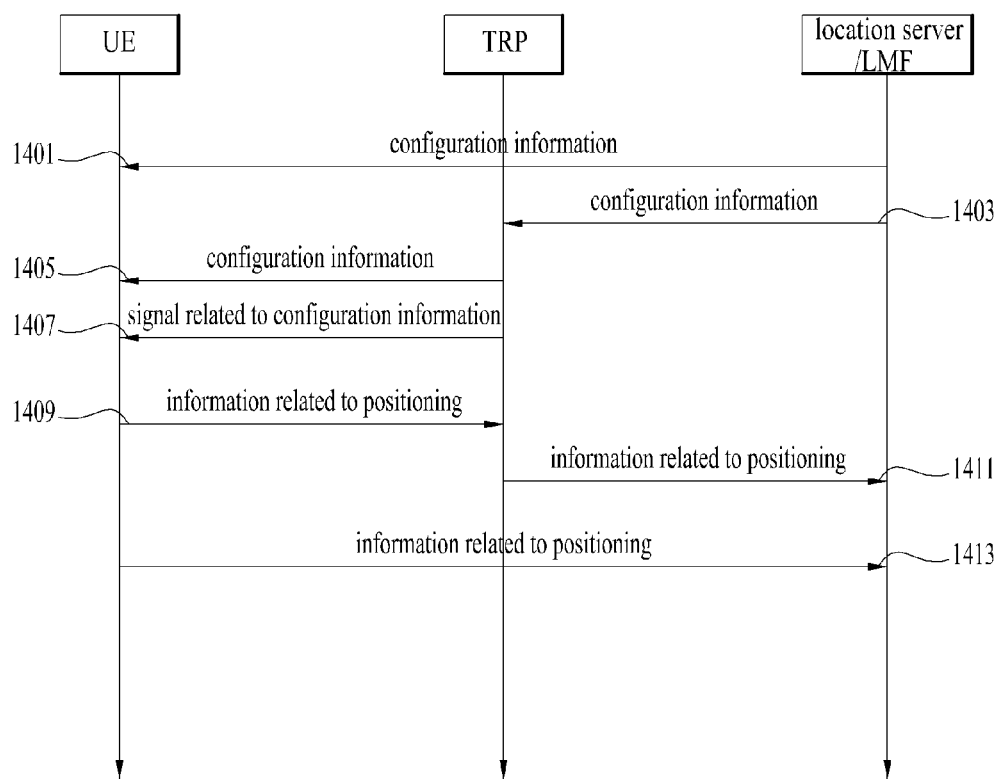
FIG. 14 is a simplified diagram illustrating a method of operating a UE, a transmission and reception point (TRP), a location server, and/or a location management function (LMF) according to various embodiments.

FIG. 14 is a diagram schematically illustrating an operation method for a UE, a TRP, a location server, and/or an LMF according to various embodiments of the present disclosure.

Referring to FIG. 14, in operation 1401 according to an exemplary embodiment, the location server and/or LMF may transmit configuration information to the UE, and the UE may receive the configuration information.

In operation 1403 according to an exemplary embodiment, the location server and/or LMF may transmit reference configuration information to the TRP, and the TRP may receive the reference configuration information. In operation 1405 according to an exemplary embodiment, the TRP may forward the reference configuration information to the UE, and the UE may receive the reference configuration information. In this case, operation 1401 according to the exemplary embodiment may be omitted.

On the contrary, operations 1403 and 1405 according to the exemplary embodiments may be omitted. In this case, operation 1401 according to the exemplary embodiment may be performed.

In other words, operations 1401 according to the exemplary embodiment and operations 1403 and 1405 according to the exemplary embodiments may be exclusive.

In operation 1407 according to an exemplary embodiment, the TRP may transmit a signal related to configuration information to the UE, and the UE may receive the signal related to configuration information. For example, the signal related to configuration information may be a signal for UE positioning In operation 1409 according to an exemplary embodiment, the UE may transmit a signal related to positioning to the TRP, and the TRP may receive the signal related to positioning. In operation 2011 (1411?) according to an exemplary embodiment, the TRP may forward the signal related to positioning to the location server and/or LMF, and the location server and/or LMF may receive the signal related to positioning.

In operation 1413 according to an exemplary embodiment, the UE may transmit the signal related to positioning to the location server and/or LMF, and the location server and/or LMF may receive the signal related to positioning. In this case, operations 1409 and 1411 according to the exemplary embodiments may be omitted.

On the contrary, operation 1413 according to the exemplary embodiment may be omitted. In this case, operations 1411 and 1413 according to the exemplary embodiments may be performed.

In other words, operations 1409 and 1411 according to the exemplary embodiments and operations 1413 according to the exemplary embodiment may be exclusive.

In an exemplary embodiment, the signal related to positioning may be obtained based on the configuration information and/or the signal related to configuration information.

Figure 15:
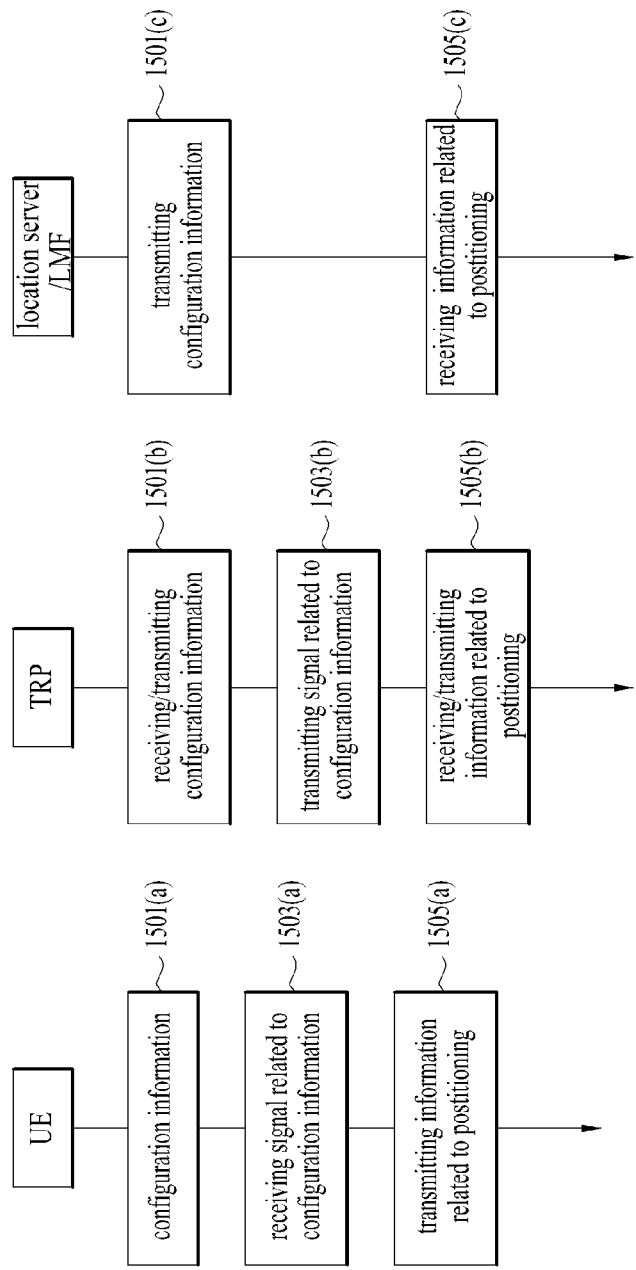
FIG. 15 is a simplified diagram illustrating a method of operating a UE, a TRP, a location server, and/or an LMF according to various embodiments.

FIG. 15 is a diagram schematically illustrating an operation method for a UE, a TRP, a location server, and/or an LMF according to various embodiments of the present disclosure.

Referring to FIG. 15(a), in operation 1501(a) according to an exemplary embodiment, the UE may receive configuration information.

In operation 1503(a) according to an exemplary embodiment, the UE may receive a signal related to configuration information.

In operation 1505(a) according to an exemplary embodiment, the UE may transmit information related to positioning Referring to FIG. 15(b), in operation 1501(b) according to an exemplary embodiment, the TRP may receive configuration information from the location server and/or LMF and forward the configuration information to the UE.

In operation 1503(b) according to an exemplary embodiment, the TRP may transmit a signal related to configuration information.

In operation 1505(b) according to an exemplary embodiment, the TRP may receive information related to positioning and forward the information related to positioning to the location server and/or LMF.

Referring to FIG. 15(c), in operation 1501(c) according to an exemplary embodiment, the location server and/or LMF may transmit configuration information.

In operation 1505(c) according to an exemplary embodiment, the location server and/or LMF may receive information related to positioning.

For example, in the following description of various embodiments of the present disclosure, the above-described configuration information may be understood to be related to a reference configuration (information), a standard configuration (information), a consultation configuration (information), and/or one or more pieces of information transmitted/ configured by the location server, LMF, and/or TRP to the UE. Additionally/alternatively, the configuration information may be interpreted to mean the corresponding reference configuration (information), standard configuration (information), consultation configuration (information), and/or one or more pieces of information transmitted/configured by the location server, LMF, and/or TRP to the UE.

For example, in the following description of various embodiments of the present disclosure, the above-described signal related to positioning may be understood as a signal related to one or more pieces of information reported by the UE. Additionally/alternatively, the signal related to positioning may be understood as a signal including one or more pieces of information reported by the UE.

Figure 16:
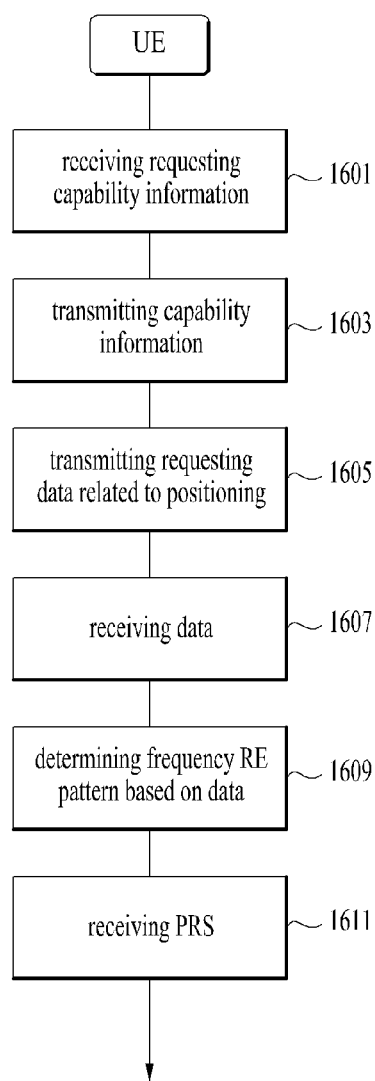
FIG. 16 is a diagram schematically illustrating an operation method for a UE according to various embodiments of the present disclosure.

FIG. 16 is a diagram schematically illustrating an operation method for a UE according to various embodiments of the present disclosure.

Referring to FIG. 16, in operation 1601 according to an exemplary embodiment, the UE may be requested to provide information on UE capability related to UE positioning. For example, the UE may receive a request from a BS/location server/LMF.

In operation 1603 according to an exemplary embodiment, the UE may transmit the information on the UE capability. For example, the UE may transmit the information on the UE capability to the BS/location server/LMF.

In operation 1605 according to an exemplary embodiment, the UE may request data related to positioning. For example, the UE may receive data required for UE positioning (e.g., assistance data of TS 36.355/37.355, etc.) from the BS/location server/LMF.

In operation 1607 according to an exemplary embodiment, the UE may receive the data related to positioning. For example, the UE may receive the data required for UE positioning (e.g., assistance data of TS 36.355, etc.) from the BS/location server/LMF. For example, the data may include RS (e.g., PRS) information to be used for UE positioning, and the UE may be configured with one or multiple RS resources. In this case, for example, frequency RE offset value(s), a comb size, the number of symbols occupied by a PRS resource, the start position of the OFDM symbols occupied by the PRS resource (e.g., the first OFDM symbol index) may be configured/indicated for each RS resource.

In operation 1609 according to an exemplary embodiment, the UE may determine/assume/expect a frequency RE pattern based on the data. For example, the UE may calculate/obtain/identify the frequency offset for each OFDM symbol of each configured RS resource to determine/configure the frequency RE pattern for all OFDM symbols occupied by each RS resource.

In operation 1611 according to an exemplary embodiment, the UE may receive an RS.

Figure 17:
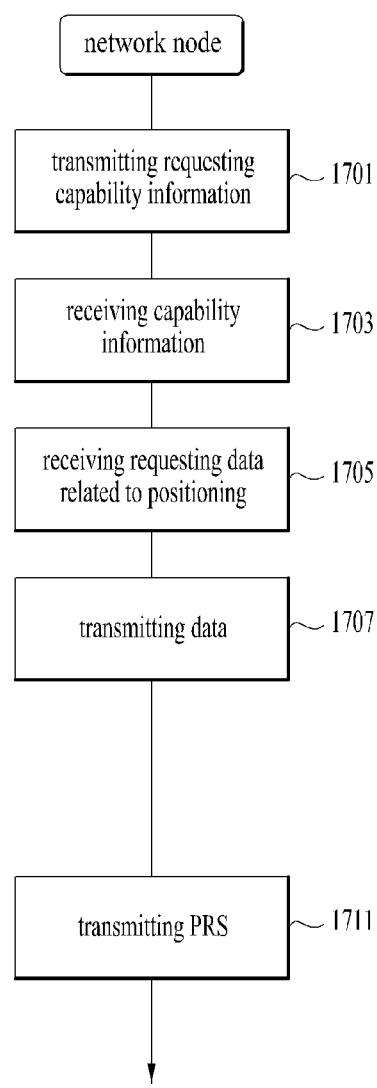
FIG. 17 is a flowchart illustrating an operation method for a network node according to various embodiments of the present disclosure.

FIG. 17 is a flowchart illustrating an operation method for a network node according to various embodiments of the present disclosure. For example, the network node may be a location server, an LMF, a TP and/or any device performing the same work.

Referring to FIG. 17, in operation 1701 according to an exemplary embodiment, the network node may request capability information. For example, the network node may request the UE to provide information on UE capability related to UE positioning.

In operation 1703 according to an exemplary embodiment, the network node may receive the capability information. For example, the network node may receive the information on the UE capability from the UE.

In operation 1705 according to an exemplary embodiment, the network node may receive a request for data related to positioning. For example, the network node may receive a request for data required for UE positioning (e.g., assistance data of TS 36.355/37.355, etc.) from the UE. However, operation 1705 according to the exemplary embodiment may be omitted. In this case, the network node (e.g., LMF, location server, etc.) may provide/transmit the data required for UE positioning to the UE without an explicit request from the UE. For example, a PRS may be transmitted/received after assistance data is provided/transmitted to the UE from the network node.

In operation 1707 according to an exemplary embodiment, the network node may transmit the data. For example, the network node (e.g., LMF, location server, etc.) may transmit the data required for UE positioning (e.g., assistance data of TS 36.355/37.355, etc.) to the UE. For example, the data may include RS (e.g., PRS) information to be used for UE positioning, and one or more RS resources may be configured. In this case, for example, frequency RE offset value(s), a comb size, the number of symbols occupied by a PRS resource, the start position of the OFDM symbols occupied by the PRS resource (e.g., the first OFDM symbol index) may be configured/indicated for each RS resource.

In operation 1711 according to an exemplary embodiment, the network node may indicate/configure/assume/expect that the UE calculates the frequency offset for each OFDM symbol of each RS resource configured to the UE and determines a frequency RE pattern for all OFDM symbols occupied by each RS resource. Additionally/alternatively, the network node may transmit an RS (resource) (to the UE).

For example, in the following description of various embodiments of the present disclosure, a BS, a gNB, a cell, etc. may be replaced with a TRP, a TP, or any device that plays the same role.

For example, in the following description of various embodiments of the present disclosure, a location server may be replaced with an LMF or any device that plays the same role.

Particular operations, functions, terms, etc. in the operations according to each exemplary embodiment may be performed and explained based on various embodiments of the present disclosure to be described later. On the other hand, the operations according to each exemplary embodiment are merely exemplary, and one or more of the above-described operations may be omitted depending on the details of each embodiment.

Hereinafter, various embodiments of the present disclosure will be described in detail. It may be understood by those of ordinary skill in the art that the various embodiments of the present disclosure described below may be combined in whole or in part to implement other embodiments of the present disclosure unless mutually exclusive.

3.1. Proposal #1

Frequency RE offset(s) (and/or comb offset(s)) for each PRS resource may be configured/indicated to the UE from the BS/LMF/location server as specific value(s). The configured/indicated frequency RE offset(s) may be frequency RE offset(s) for specific OFDM symbol(s) among M (where M is a natural number greater than or equal to 1) OFDM symbols occupied by the PRS resource.

For example, frequency RE offset(s) (for other OFDM symbols) except for the specific OFDM symbol(s) having the frequency RE offset(s) configured therefor among the M OFDM symbols occupied by the PRS resource may be indicated based one or more of the following parameters (e.g., as a function of one or more of the following parameters):

1) The frequency RE offset value(s) configured/indicated for the PRS resource;
2) The comb size for the PRS resource, N (where N is a natural number);
3) The total number of OFDM symbols occupied by the PRS resource, M (where M is a natural number);
4) The OFDM symbol index (or indices) occupied by the PRS resource in a slot, that is, the indices of OFDM symbol(s) in the slot or the indices of OFDM symbol(s) included in the PRS resource; and
5) The TP ID or PCID of an area in which the UE configured with the PRS is located.

For example, the frequency RE offset(s) (for other OFDM symbols) except for the specific OFDM symbol(s) having the frequency RE offset(s) configured therefor among the M OFDM symbols may be configured/indicated based one or more of the above five parameters (e.g., as the function of one or more of the above parameters).

In various embodiments of the present disclosure below, it is proposed that PRS resource frequency offset(s) are configured/indicated in a more simplified form without information on the TP ID and/or cell ID to which the UE belongs in order to reduce the complexity of configuring the PRS resource frequency offset(s).

Hereinafter, various embodiments of the present disclosure will be described in detail.

3.2. Proposal #2

The BS/location server/LMF may configure/indicate to the UE only a single frequency RE offset (and/or a single comb offset) for one PRS resource occupying M OFDM symbols (where M is a natural number greater than or equal to 1).

In this case, frequency RE offset(s) for other OFDM symbols except for specific OFDM symbol(s) having frequency RE offset(s) indicated/configured therefor may be configured/indicated based on one or more of the five parameters described above in Proposal #1 (e.g., as the function of one or more of the five parameters).

In particular, when a frequency RE offset for the first OFDM symbol of a single PRS resource that occupies M OFDM symbols is configured/indicated, frequency RE offsets for the remaining M−1 OFDM symbols may be configured/indicated based on one or more of the following four parameters (e.g., as a function of one or more of the four parameters):

1) The frequency RE offset value configured/indicated for the PRS resource;
2) The comb size for the PRS resource, N (where N is a natural number);
3) The total number of OFDM symbols occupied by the PRS resource, M (where M is a natural number); and
4) The OFDM symbol index (or indices) occupied by the PRS resource in a slot, that is, the indices of OFDM symbol(s) in the slot or the indices of OFDM symbol(s) included in the PRS resource.

As a particular example, a frequency RE offset for a frequency RE pattern of a specific OFDM symbol (hereinafter, denoted by $l_{index}$ of a PRS resource may be indicated/configured as a function of the following four parameters:

1) The frequency RE offset value configured/indicated for the PRS resource;
2) The comb size for the PRS resource, N (where N is a natural number);

3) The total number of OFDM symbols occupied by the PRS resource, M (where M is a natural number); and
4) The starting OFDM symbol index of the PRS resource, that is, the index of the first OFDM symbol among the OFDM symbols included in the PRS resource.

For example, Equation (1-1) or Equation (1-2) below may be considered.

$$\left(O_{COmb}(l_{start}) + \left[\left(\frac{N}{M}\right) \times (l_{index} - l_{start})\right]\right) \bmod N = \qquad \text{[Equation (1-1)]}$$
$$O_{Comb}(l_{index})$$

$$\left(O_{COmb}(l_{start}) + \left\lceil\left(\frac{N}{M}\right) \times (l_{index} - l_{start})\right\rceil\right) \bmod N = \qquad \text{[Equation (1-2)]}$$
$$O_{Comb}(l_{index})$$

The notation used in Equation (1-1) and Equation (1-2) is defined as follows.

Mod: Mod denotes a modular operation (modulo arithmetic or modulo operation). For example, the modular operation is an operation to obtain remainder r obtained by dividing dividend q by divisor d (r=q mod (d)).

$l_{start}$: $l_{start}$ denotes the index of the first OFDM symbol among OFDM symbols occupied by a slot in which the PRS resource is configured, that is, the index of the first OFDM symbol among the OFDM symbols included in the PRS resource within the slot. For example, $l_{start}$ may be configured/indicated by the BS/location server/LMF to the UE. Since this value is a symbol index, $l_{start}$ may have a specific value from 0 to 13 (for example, in the case of a normal CP).

$l_{index}$: $l_{index}$ denotes the index of an OFDM symbol occupied by the slot in which the PRS resource is configured, that is, the index of an OFDM symbol in the slot or the index of an OFDM symbol included in the PRS resource. Since this value is a symbol index, $l_{index}$ may have a specific value from 0 to 13 (for example, in the case of a normal CP).

$O_{Comb}(l)$: $O_{Comb}(l)$ denotes a comb offset (and/or frequency RE offset) in OFDM symbol index l.

For example, in Equation (1-1) to Equation (1-2), $O_{comb}(l_{start})$ may be configured/indicated by the BS/location server/LMF to the UE.

N: N denotes a comb size, where N is a natural number.

M: M denotes the total number of OFDM symbols occupied by the PRS in one slot, where M is a natural number.

$\lfloor A \rfloor$: $\lfloor A \rfloor$ denotes floor (A), which is a floor operation or function. $\lfloor A \rfloor$ may mean the largest integer less than or equal to real number A (i.e., the largest integer not more than A).

$\lceil A \rceil$: $\lceil A \rceil$ denotes ceiling (A), which is a ceiling operation or function. $\lceil A \rceil$ may mean the smallest integer more than or equal to real number A (i.e., the smallest integer not less than A).

As another example, the frequency offset configured/indicated by the BS/location server/LMF to the UE may be the frequency offset for the last OFDM symbol rather than that for the first symbol among M OFDM symbols occupied by the PRS resource (where M is a natural number greater than or equal to 1).

In this case, Equation (2-1) or Equation (2-2) below may be considered by modifying Equation (1-1) or Equation (1-2).

$$\left(O_{COmb}(l_{start}) + \left\lfloor\left(\frac{N}{M}\right) \times (l_{last} - l_{index})\right\rfloor\right) \bmod N = \qquad \text{[Equation (2-1)]}$$
$$O_{Comb}(l_{index})$$

$$\left(O_{COmb}(l_{start}) + \left\lceil\left(\frac{N}{M}\right) \times (l_{last} - l_{index})\right\rceil\right) \bmod N = \qquad \text{[Equation (2-2)]}$$
$$O_{Comb}(l_{index})$$

The notation used in Equation (2-1) and Equation (2-2) is defined as follows.

Mod: Mod denotes a modular operation (modulo arithmetic or modulo operation). For example, the modular operation is an operation to obtain remainder r obtained by dividing dividend q by divisor d (r=q mod (d)).

$l_{start}$: $l_{start}$ denotes the index of the first OFDM symbol among OFDM symbols occupied by a slot in which the PRS resource is configured, that is, the index of the first OFDM symbol among the OFDM symbols included in the PRS resource within the slot. For example, $l_{start}$ may be configured/indicated by the BS/location server/LMF to the UE. Since this value is a symbol index, $l_{start}$ may have a specific value from 0 to 13 (for example, in the case of a normal CP).

$l_{last}$: $l_{last}$ denotes the index of the last OFDM symbol among OFDM symbols occupied by a slot in which the PRS resource is configured, that is, the index of the last OFDM symbol among the OFDM symbols included in the PRS resource within the slot. For example, $l_{last}$ may be configured/indicated by the BS/location server/LMF to the UE. Since this value is a symbol index, $l_{last}$ may have a specific value from 0 to 13 (for example, in the case of a normal CP).

$l_{index}$: $l_{index}$ denotes the index of an OFDM symbol occupied by the slot in which the PRS resource is configured, that is, the index of an OFDM symbol in the slot or the index of an OFDM symbol included in the PRS resource. Since this value is a symbol index, $l_{index}$ may have a specific value from 0 to 13 (for example, in the case of a normal CP).

$O_{Comb}$: $O_{Comb}(l)$ denotes a comb offset (and/or frequency RE offset) in OFDM symbol index l.

For example, in Equation (2-1) to Equation (2-2), $O_{comb}(l_{start})$ may be configured/indicated by the BS/location server/LMF to the UE.

N: N denotes a comb size, where N is a natural number.

M: M denotes the total number of OFDM symbols occupied by the PRS in one slot, where M is a natural number.

$\lfloor A \rfloor$: $\lfloor A \rfloor$ denotes floor (A), which is a floor operation or function. $\lfloor A \rfloor$ may mean the largest integer less than or equal to real number A (i.e., the largest integer not more than A).

$\lceil A \rceil$: $\lceil A \rceil$ denotes ceiling (A), which is a ceiling operation or function. $\lceil A \rceil$ may mean the smallest integer more than or equal to real number A (i.e., the smallest integer not less than A).

According to various embodiments of the present disclosure, Equations (1-1) and (1-2) and Equations (2-1) and (2-2) may be effectively used to create the staggered RE pattern of a PRS resource when N>=M. Hereinafter, a method of effectively configuring/indicating a frequency RE offset for creating the staggered RE pattern of a PRS resource when N<M according to various embodiments of the present disclosure will be described.

3.2.1. Proposal #2-1

When (the frequency offset for) the first OFDM symbol among M OFDM symbols occupied by a specific slot having a PRS resource configured therein is configured/indicated to the UE, the frequency RE offset for an OFDM symbol ($l_{index}$) of the PRS resource may be configured/indicated as shown in Equation (3-1) or (3-2) below.

$$\left(O_{COmb}(l_{start}) + \left\lfloor \max\left(\frac{N}{M}, \frac{M}{N}\right) \times (l_{index} - l_{start}) \right\rfloor \right) \mod N = \quad \text{[Equation (3-1)]}$$
$$O_{Comb}(l_{index})$$

$$\left(O_{COmb}(l_{start}) + \left\lceil \max\left(\frac{N}{M}, \frac{M}{N}\right) \times (l_{index} - l_{start}) \right\rceil \right) \mod N = \quad \text{[Equation (3-2)]}$$
$$O_{Comb}(l_{index})$$

When the frequency RE offset for the last symbol among the M OFDM symbols occupied by the specific slot having the PRS resource configured therein is configured/indicated, the frequency RE offset for the OFDM symbol ($l_{index}$) of the PRS resource may be configured/indicated as shown in Equation (4-1) or (4-2) below.

$$\left(O_{COmb}(l_{start}) + \left\lfloor \max\left(\frac{N}{M}, \frac{M}{N}\right) \times (l_{last} - l_{index}) \right\rfloor \right) \mod N = \quad \text{[Equation (4-1)]}$$
$$O_{Comb}(l_{index})$$

$$\left(O_{COmb}(l_{start}) + \left\lceil \max\left(\frac{N}{M}, \frac{M}{N}\right) \times (l_{last} - l_{index}) \right\rceil \right) \mod N = \quad \text{[Equation (4-2)]}$$
$$O_{Comb}(l_{index})$$

The notation used in Equation (3-1), Equation (3-2), Equation (4-1), and Equation (4-2) is defined as follows.

Mod: Mod denotes a modular operation (modulo arithmetic or modulo operation). For example, the modular operation is an operation to obtain remainder r obtained by dividing dividend q by divisor d (r=q mod (d)).

$l_{start}$: $l_{start}$ denotes the index of the first OFDM symbol among OFDM symbols occupied by a slot in which the PRS resource is configured, that is, the index of the first OFDM symbol among the OFDM symbols included in the PRS resource within the slot. For example, $l_{start}$ may be configured/indicated by the BS/location server/LMF to the UE. Since this value is a symbol index, $l_{start}$ may have a specific value from 0 to 13 (for example, in the case of a normal CP).

$l_{last}$: $l_{last}$ denotes the index of the last OFDM symbol among OFDM symbols occupied by a slot in which the PRS resource is configured, that is, the index of the last OFDM symbol among the OFDM symbols included in the PRS resource within the slot. For example, $l_{last}$ may be configured/indicated by the BS/location server/LMF to the UE. Since this value is a symbol index, $t_{last}$ may have a specific value from 0 to 13 (for example, in the case of a normal CP).

$l_{index}$: $l_{index}$ denotes the index of an OFDM symbol occupied by the slot in which the PRS resource is configured, that is, the index of an OFDM symbol in the slot or the index of an OFDM symbol included in the PRS resource. Since this value is a symbol index, $l_{index}$ may have a specific value from 0 to 13 (for example, in the case of a normal CP).

$O_{Comb}(l)$: $O_{Comb}(l)$ denotes a comb offset (and/or frequency RE offset) in OFDM symbol index l.

For example, $O_{Comb}(l_{start})$ may be configured/indicated by the BS/location server/LMF to the UE.

N: N denotes a comb size, where N is a natural number.

M: M denotes the total number of OFDM symbols occupied by the PRS in one slot, where M is a natural number.

$\lfloor A \rfloor$: $\lfloor A \rfloor$ denotes floor (A), which is a floor operation or function. $\lfloor A \rfloor$ may mean the largest integer less than or equal to real number A (i.e., the largest integer not more than A).

$\lceil A \rceil$: $\lceil A \rceil$ denotes ceiling (A), which is a ceiling operation or function. $\lceil A \rceil$ may mean the smallest integer more than or equal to real number A (i.e., the smallest integer not less than A).

max (A, B): max (A, B) denotes a maximum (max) function, that is, the maximum of A and B.

In this section and the description of various embodiments of the present disclosure, the equation for the frequency offset for the OFDM symbol ($l_{index}$) of the PRS resource may be appropriately modified. For example, one or more of the following variations may be considered.

Equation (1-1), (1-2), (3-1), and/or (3-2) may be further simplified by using only $l_{index}$ instead of ($l_{index}-l_{start}$). That is, the frequency offset equation may be modified into a function of the configured single frequency offset, the total number of OFDM symbols occupied by the PRS resource M, and the comb size N, without the starting OFDM symbol index.

Similarly, Equation (2-1), (2-2), (4-1), and/or (4-2) may be further simplified by using only $l_{index}$ instead of ($l_{index}-l_{start}$). That is, the frequency offset equation may be modified into a function of the configured single frequency offset, the total number of OFDM symbols occupied by the PRS resource M, and the comb size N, without the last OFDM symbol index.

Alternatively, in the above-described equations, the modular operation on the comb size N may be substituted by a fixed value. For example, the modular operation may be performed on a predetermined/predefined specific value.

For example, assuming that the specific value (e.g., predefined and/or signaled value) is K and the equations proposed above are ( ) mod K when the PRS resource is configured, it may be considered to change the equations to ( ) mod K. That is, for example, a mod N operation may be changed to a mod K operation.

Illustrative Example

Figure 18:
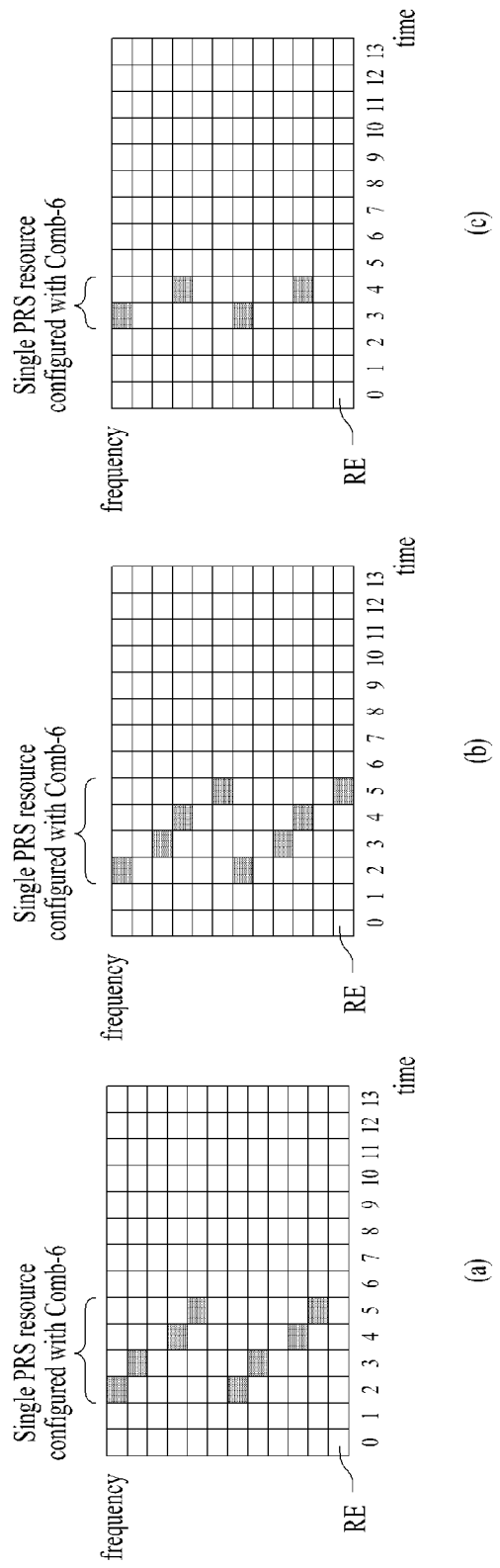
FIG. 18 is a diagram illustrating an exemplary positioning reference signal (PRS) resource configuration according to various embodiments of the present disclosure.

FIG. 18 is a diagram illustrating an exemplary PRS resource configuration according to various embodiments of the present disclosure.

FIG. 18 shows an exemplary PRS resource configuration based on Proposal #2-1 according to various embodiments of the present disclosure.

Referring to FIGS. 18(a) and 18(b), a specific PRS resource may have a comb size of 6 and occupy a total of four OFDM symbols. In addition, the starting OFDM symbol index of the specific PRS resource may be 3 (starting from 0) (when a total of 14 OFDM symbols have indices from 0 to 13). In addition, the frequency RE offset (for the first OFDM symbol, that is, for the starting OFDM symbol) configured/indicated to the UE for the PRS resource may be 0.

Referring to FIG. 18 (a), when the frequency RE offset of the PRS resource consisting of four symbols is configured based on Equation (3-1) according to various embodiments of the present disclosure, the frequency RE offsets for the second, third, and fourth OFDM symbols of the PRS resource may be 1, 3, and 4, respectively.

As another example, referring to FIG. 18 (b), when the frequency RE offset of a PRS resource consisting of four symbols is configured based on Equation (3-1) (3-2?) according to various embodiments of the present disclosure, the frequency RE offsets for the second, third, and fourth OFDM symbols of the PRS resource may be 2, 3, and 5, respectively.

In Proposal #2-1 according to various embodiments of the present disclosure, the maximum function may be used to configure the frequency RE offset of a PRS resource.

For example, if $$\max\left(\frac{N}{M}, \frac{M}{N}\right)$$

is introduced, each of all OFDM symbols occupied by a PRS resource may use a different frequency RE rather than the same frequency RE, regardless of the comb size of the PRS resource and the number of OFDM symbols occupied by the PRS resource.

That is, a PRS resource with the staggered RE pattern may be appropriately configured/indicated based on information on a single configured frequency RE offset according to Equation (3-1), Equation (3-2), Equation (4-1), and/or Equation (4-2). In addition, considering the effect of channel variation on used frequency resources from the interpolation point of view, it may be better for the staggered RE pattern to use multiple frequency REs (uniformly distributed) than frequency REs clustered at a specific position in a specific signal RB.

FIG. 18(c) shows an example in which a PRS resource is configured to have a comb size of 6 and occupy two OFDM symbols.

For example, when a specific PRS resource has a comb size of 6 and occupies two symbols, if the frequency RE offset of the first symbol of the specific PRS resource is 0, the first frequency RE and the seventh frequency RE may be used in the first symbol.

Thus, it may be appropriate that the fourth frequency RE among frequency REs used in the first symbol of the specific PRS resource is used as the frequency RE offset for the second symbol of the specific PRS resource, which may be a case where the frequency RE offset value corresponds to 3. When Equation (3-1) or (3-2) of Proposal #2-1 according to various embodiments of the present disclosure is used, if the frequency RE offset for the first OFDM symbol of the comb-6 PRS resources occupying two OFDM symbols is 0 as shown in FIG. 18(c), a staggered RE pattern with a frequency RE offset of 3 for the second OFDM symbol may be created.

Proposal #2-1 according to various embodiments of the present disclosure may be more complicated because Proposal #2-1 requires the operation of selecting a maximum value compared to Proposal #2. However, Proposal #2-1 has the advantage of effectively configuring the frequency RE offset value, regardless of the ranges of the values of N and M.

On the other hand, Proposal #2 according to various embodiments of the present disclosure may need to appropriately limit the ranges of the values of N and M, but Proposal #2 may be effective because Proposal #2 is simplified in terms of complexity compared to Proposal #2-1.

3.2.2. Proposal #2-2

The methods described above in Proposal #2 and Proposal #2-1 according to various embodiments of the present disclosure may be used only when the comb size is more than 2.

When the comb size is 2, the frequency RE offset for an OFDM symbol ($l_{index}$) of a PRS resource may be configured/indicated according to the following equation.

$$(O_{Comb}(l_{start})+(l_{index}-l_{start})) \bmod N = O_{Comb}(l_{index})$$

Mod: Mod denotes a modular operation (modulo arithmetic or modulo operation). For example, the modular operation is an operation to obtain remainder r obtained by dividing dividend q by divisor d (r=q mod (d)).

$l_{start}$: $l_{start}$ denotes the index of the first OFDM symbol among OFDM symbols occupied by a slot in which the PRS resource is configured, that is, the index of the first OFDM symbol among the OFDM symbols included in the PRS resource within the slot. For example, $l_{start}$ may be configured/indicated by the BS/location server/LMF to the UE. Since this value is a symbol index, $l_{start}$ may have a specific value from 0 to 13 (for example, in the case of a normal CP).

$l_{index}$: $l_{index}$ denotes the index of an OFDM symbol occupied by the slot in which the PRS resource is configured, that is, the index of an OFDM symbol in the slot or the index of an OFDM symbol included in the PRS resource. Since this value is a symbol index, $l_{index}$ may have a specific value from 0 to 13 (for example, in the case of a normal CP).

$O_{Comb}(l)$: $O_{Comb}(l)$ denotes a comb offset (and/or frequency RE offset) in OFDM symbol index l.

For example, $O_{Comb}(l_{start})$ may be configured/indicated by the BS/location server/LMF to the UE.

N: N denotes a comb size, where N=2.

Effects of Proposal #2-2

In the methods based on Proposal #2 and Proposal #2-1 according to various embodiments of the present disclosure, when the comb size of a PRS resource is 2 and the number of OFDM symbols occupied by the PRS resource is more than or equal to 4 (M>=4), the PRS resource may have no appropriate staggered RE pattern, and as a result, performance degradation may occur.

However, even when the comb size of the PRS resource is 2, an appropriate staggered RE pattern may be created based on Proposal #2-2 according to various embodiments of the present disclosure.

Additionally, when the comb size is greater than 2, an appropriate staggered RE pattern may be created based on Proposal #2 and Proposal #2-1 according to various embodiments of the present disclosure.

3.2.3. Proposal #2-3

When the comb size of a PRS resource is 2 (N=2) and the number of symbols occupied by the PRS resource is more than or equal to 4, the frequency RE pattern of the PRS resource may be configured to be an appropriate staggered RE pattern based on Proposal #2-2 according to various embodiments of the present disclosure, thereby supplementing Proposal #2-1 according to various embodiments of the present disclosure.

Hereinafter, a method in which the frequency RE pattern of a PRS resource does not need to be configured/indicated so that unnecessary signaling overhead may be reduced will be described.

If the UE is configured/indicated with (the frequency RE offset for) the first OFDM symbol among M OFDM symbols occupied by a specific slot in which a PRS resource is configured (where M is a natural number), the frequency RE offset for an OFDM symbol ($l_{index}$) of the PRS resource may be configured/indicated as shown in Equation (5-1) or (5-2)

$$O_{Comb}(l_{index}) = \left(O_{COmb}(l_{start}) + \left\lfloor \min\left(\max\left(\frac{N}{M}, \frac{M}{N}\right), N-1\right) \times (l_{index} - l_{start})\right\rfloor\right) \bmod N \quad \text{[Equation (5-1)]}$$

$$O_{Comb}(l_{index}) = \left(O_{COmb}(l_{start}) + \left\lceil \min\left(\max\left(\frac{N}{M}, \frac{M}{N}\right), N-1\right) \times (l_{index} - l_{start})\right\rceil\right) \bmod N \quad \text{[Equation (5-2)]}$$

If the UE is configured/indicated with the frequency RE offset for the last symbol among the M OFDM symbol occupied by the slot in which the PRS resource is configured (where M is a natural number), the frequency RE offset for the OFDM symbol ($l_{index}$) of the PRS resource may be configured/indicated as shown in Equation (6-1) or (6-2) below.

$$O_{Comb}(l_{index}) = \left(O_{COmb}(l_{start}) + \left\lfloor \min\left(\max\left(\frac{N}{M}, \frac{M}{N}\right), N-1\right) \times (l_{last} - l_{index})\right\rfloor\right) \bmod N \quad \text{[Equation (6-1)]}$$

$$O_{Comb}(l_{index}) = \left(O_{COmb}(l_{start}) + \left\lceil \min\left(\max\left(\frac{N}{M}, \frac{M}{N}\right), N-1\right) \times (l_{last} - l_{index})\right\rceil\right) \bmod N \quad \text{[Equation (6-2)]}$$

The notation used in Equation (5-1), Equation (5-2), Equation (6-1), and Equation (6-2) is defined as follows.
  Mod: Mod denotes a modular operation (modulo arithmetic or modulo operation). For example, the modular operation is an operation to obtain remainder r obtained by dividing dividend q by divisor d (r=q mod (d)).
  $l_{start}$: $l_{start}$ denotes the index of the first OFDM symbol among OFDM symbols occupied by a slot in which the PRS resource is configured, that is, the index of the first OFDM symbol among the OFDM symbols included in the PRS resource within the slot. For example, $l_{start}$ may be configured/indicated by the BS/location server/LMF to the UE. Since this value is a symbol index, $l_{start}$ may have a specific value from 0 to 13 (for example, in the case of a normal CP).
  $l_{last}$: $l_{last}$ denotes the index of the last OFDM symbol among OFDM symbols occupied by a slot in which the PRS resource is configured, that is, the index of the last OFDM symbol among the OFDM symbols included in the PRS resource within the slot. For example, $l_{last}$ may be configured/indicated by the BS/location server/LMF to the UE. Since this value is a symbol index, $l_{last}$ may have a specific value from 0 to 13 (for example, in the case of a normal CP).
  $l_{index}$: $l_{index}$ denotes the index of an OFDM symbol occupied by the slot in which the PRS resource is configured, that is, the index of an OFDM symbol in the slot or the index of an OFDM symbol included in the PRS resource. Since this value is a symbol index, $l_{index}$ may have a specific value from 0 to 13 (for example, in the case of a normal CP).
  $O_{Comb}(l)$: $O_{Comb}(l)$ denotes a comb offset (and/or frequency RE offset) in OFDM symbol index l.
    For example, $O_{Comb}(l_{start})$ may be configured/indicated by the BS/location server/LMF to the UE.
  N: N denotes a comb size, where N is a natural number.
  M: M denotes the total number of OFDM symbols occupied by the PRS in one slot, where M is a natural number.
  $\lfloor A \rfloor$: $\lfloor A \rfloor$ denotes floor (A), which is a floor operation or function. $\lfloor A \rfloor$ may mean the largest integer less than or equal to real number A (i.e., the largest integer not more than A).
  $\lceil A \rceil$: $\lceil A \rceil$ denotes ceiling (A), which is a ceiling operation or function. $\lceil A \rceil$ may mean the smallest integer more than or equal to real number A (i.e., the smallest integer not less than A).
  max (A, B): max (A, B) denotes a maximum (max) function, that is, the maximum of A and B.
  min (A, B): min (A, B) denotes a minimum (min) function, that is, the minimum of A and B.

In Proposal #2-3 according to various embodiments of the present disclosure, since $$\min\left(\max\left(\frac{N}{M}, \frac{M}{N}\right), N-1\right)$$

always produces a result of 1 when the comb size is 2 and the number of symbols is 2, 4, or 6, so that an appropriate staggered RE pattern may be configured/indicated even if the comb size of the PRS resource is configured/indicated as 2.

In addition, as the symbol index increases or decreases, a frequency subcarrier RE (frequency RE or subcarrier) that is as far away as possible may be used instead of an adjacent frequency subcarrier RE (frequency RE or subcarrier). Thus, frequency subcarrier REs (frequency REs or subcarriers) may be used uniformly, thereby obtaining a gain of interpolation.

Hereinafter, particular examples of Equation (5-1) of Proposal #2-3 according to various embodiments of the present disclosure will be described.

For example, it is assumed that the comb size of the PRS resource is 2 (N=2) and the number of symbols occupied by the PRS resource is 2, 4, or 6.
  For N=2:
    When N=2 and M=6:
      The frequency RE offset of the first symbol: $O_{Comb}(l_{start})$ mod 2
      The frequency RE offset of the second symbol: ($O_{Comb}(l_{start})$+1) mod 2
      The frequency RE offset of the third symbol: ($O_{Comb}(l_{start})$+2) mod 2
      The frequency RE offset of the fourth symbol: ($O_{Comb}(l_{start})$+3) mod 2
      The frequency RE offset of the fifth symbol: ($O_{Comb}(l_{start})$+4) mod 2
      The frequency RE offset of the sixth symbol: ($O_{Comb}(l_{start})$+5) mod 2
    A case in which N=2 and M=2 and a case in which N=2 and M=4 may be easily inferred from the above.
    For example, when M=2, it may correspond to the first and second symbols (i.e., two symbols) occupied by the PRS. That is, when M=2, the frequency RE offsets for the first and second symbols (two symbols) occupied by the PRS may be determined.

For example, when M=4, it may correspond to the first to fourth symbols (i.e., four symbols) occupied by the PRS. That is, when M=4, the frequency RE offsets for the first to second (fourth?) symbols (four symbols) occupied by the PRS may be determined.

For N=4:
  When N=4 and M=2:
    The frequency RE offset of the first symbol: $O_{Comb}(l_{start})$ mod 4
    The frequency RE offset of the second symbol: $(O_{Comb}(l_{start})+\lfloor 2 \rfloor)$mod 4=$(O_{Comb}(l_{start})+2)$mod 4
  When N=4 and M=4:
    The frequency RE offset of the first symbol: $O_{Comb}(l_{start})$ mod 4
    The frequency RE offset of the second symbol: $(O_{Comb}(l_{start})+\lfloor 1 \rfloor)$mod 4 $O_{Comb}(l_{start})+1)$mod 4
    The frequency RE offset of the third symbol: $(O_{Comb}(l_{start})+\lfloor 2 \rfloor)$mod 4=$O_{Comb}(l_{start})+2)$mod 4
    The frequency RE offset of the fourth symbol: $(O_{Comb}(l_{start})+\lfloor 3 \rfloor)$mod 4=$O_{Comb}(l_{start})+3)$mod 4
  When N=4 and M=6:
    The frequency RE offset of the first symbol: $O_{Comb}(l_{start})$mod 4
    The frequency RE offset of the second symbol: $(O_{Comb}(l_{start})+-\lfloor 1.5 \rfloor)$mod 4=$O_{Comb}(l_{start})+1)$mod 4
    The frequency RE offset of the third symbol: $(O_{Comb}(l_{start})+\lfloor 3 \rfloor)$mod 4=$O_{Comb}(l_{start})+3)$mod 4
    The frequency RE offset of the fourth symbol: $(O_{Comb}(l_{start})+\lfloor 4.5 \rfloor)$mod 4 $O_{Comb}(l_{start})+4)$mod 4
    The frequency RE offset of the fifth symbol: $(O_{Comb}(l_{start})+\lfloor 6 \rfloor)$mod 4=$O_{Comb}(l_{start})+6)$mod 4
    The frequency RE offset of the sixth symbol: $(O_{Comb}(l_{start})+\lfloor 7.5 \rfloor)$mod 4=$O_{Comb}(l_{start})+7)$mod 4

For N=6:
  When N=6 and M=2:
    The frequency RE offset of the first symbol: $O_{Comb}(l_{start})$mod 6
    The frequency RE offset of the second symbol: $(O_{Comb}(l_{start})+3)$mod 6
  When N=6 and M=4:
    The frequency RE offset of the first symbol: $O_{Comb}(l_{start})$mod 6
    The frequency RE offset of the second symbol: $(O_{Comb}(l_{start})+\lfloor 1.5 \rfloor)$ mod 6=$O_{Comb}(l_{start})+1)$mod 6
    The frequency RE offset of the third symbol: $(O_{Comb}(l_{start})+\lfloor 3 \rfloor)$mod 6=$O_{Comb}(l_{start})+3)$mod 6
    The frequency RE offset of the fourth symbol: $(O_{Comb}(l_{start})+\lfloor 4.5 \rfloor)$mod 6=$O_{Comb}(l_{start})+4)$mod 6
  When N=6 and M=6:
    The frequency RE offset of the first symbol: $O_{Comb}(l_{start})$mod 6
    The frequency RE offset of the second symbol: $(O_{Comb}(l_{start})+1)$mod 6
    The frequency RE offset of the third symbol: $(O_{Comb}(l_{start})+2)$mod 6
    The frequency RE offset of the fourth symbol: $(O_{Comb}(l_{start})+3)$mod 6
    The frequency RE offset of the fifth symbol: $(O_{Comb}(l_{start})+4)$mod 6
    The frequency RE offset of the sixth symbol: $(O_{Comb}(l_{start})+5)$mod 6

That is, it may be seen from the above examples that according to various proposals/equations of the present disclosure, frequency subcarrier REs (frequency REs or subcarriers) are configured/indicated to be used as uniformly as possible in the symbols occupied by the PRS resource, regardless of the comb size of the PRS resource and the total number of symbols of the PRS resource.

3.2.4. Proposal #2-4

Multiple candidate rules or equations for configuring the comb offsets for OFDM symbols of a PRS resource except for the comb offset for a specific OFDM symbol (e.g., the first OFDM symbol) of the PRS resource, which is indicated by the BS/location server/LMF, may be configured, and one of the multiple candidate rules or equations may be activated.

For example, the comb offsets for the remaining symbols may be configured/indicated as relative values (relative comb offsets) with respect to the comb offset indicated for the specific symbol (e.g., the first OFDM symbol).

Additionally/alternatively, multiple candidate methods/equations for deriving/calculating a relative value may be configured/indicated (by the BS/location server/LMF) to the UE.

For example, the BS/location server/LMF may use Equations (3-1) and (3-2) described above in Proposal #2-1 according to various embodiments of the present disclosure to configure/indicate to the UE the comb offsets for the other symbols except for the first symbol of the PRS resource. Additionally/alternatively, the BS/location server/LMF may activate one of Equations (3-1) and (3-2) to be actually used. For example, the BS/location server/LMF may inform the UE that Equation (3-1) (or Equation (3-2)) is activated. Similarly, the BS/location server/LMF may use Equations (4-1) and (4-2) described above in Proposal #2-1 according to various embodiments of the present disclosure to configure/indicate to the UE the comb offsets for the other symbols except for the first symbol of the PRS resource. Additionally/alternatively, the BS/location server/LMF may activate one of Equations (4-1) and (4-2) to be actually used. For example, the BS/location server/LMF may inform the UE that Equation (4-1) (or Equation (4-2)) is activated. The above-described method according to various embodiments of the present disclosure may be equally applied to Equations (5-1) and (5-2) (or Equations (6-1) and (6-2)) according to various embodiments of the present disclosure.

In this case, the configuration method may vary depending on the comb size. For example, when the comb size is 2, a bit-reversal method (e.g., Proposal #3-1 and/or Proposal #3-2 according to various embodiments of the present disclosure), which will be described later, may be used. When the comb size is greater than 2, the method of Proposal #2-3 according to various embodiments of the present disclosure (e.g., method based on the above-described equations) may be used.

3.3. Proposal #3

In the description of various embodiments of the present disclosure, bit reversal may be defined as follows.

Bit-Reversal Permutation

In applied mathematics, a bit-reversal permutation is a permutation of a sequence of n items, where n=2^k is a power of 2. The bit-reversal permutation may be defined by indexing the elements of the sequence by the numbers from 0 to n−1 and then reversing the binary representation of each of the numbers (padded so that each of the binary numbers exactly has a length of k). Then, each item may be mapped to a new position given by the reversed value. The bit-reversal permutation is an involution, so that when the same permutation is repeated twice, the times may return to the original order.

The bit-reversal permutation may be applied to any sequence in linear time while only simple index calculation is performed. The bit-reversal permutation may be applied to generation of low-discrepancy sequences and evaluation of fast Fourier transforms.

EXAMPLES

Assuming a sequence of eight letters: abcdefgh, the indices thereof may be the following binary numbers: 000, 001, 010, 011, 100, 101, 110, and 111, and the indices may be 000, 100, 010, 110, 001, 101, 011, and 111 when reversed. Thus, the letter 'a' at a position of 000 may be mapped to the same position of 000, the letter 'b' at a position of 001 may be mapped to the fifth position (numbered as 100), etc., thereby giving a new sequence of aecgbfdh. If the same permutation is repeated on the new sequence, the new sequence may return to the original sequence.

If the indices are written in decimal (however, as above, starting at position 0 rather than starting at position 1, which is more common for permutations), a bit-reversal permutation with a size of $2^k$ (where k=0, 1, 2, 3, . . . ) may be defined as follows:

k=0: 0
k=1: 0 1
k=2: 0 2 1 3
k=3: 0 4 2 6 1 5 3 7
k=4: 0 8 4 12 2 10 6 14 1 9 5 13 3 11 7 15

(sequence A030109 in the On-Line Encyclopedia of Integer Sequences)

Each permutation of this sequence may be generated by concatenating double of the previous permutation and the same sequence with each value increased by 1. For example, doubling the length-4 permutation 0 2 1 3 gives 0 4 2 6, and adding 1 thereto gives 1 5 3 7, and concatenating these two sequences gives 0 4 2 6 1 5 3 7.

Generalization

The generalization to $n=b^m$ for an arbitrary integer b>1 is a base-b digit-reversal permutation, in which the base-b digits of the index of each element may be reversed to obtain a permuted index.

A further generalization to any composite sizes may be a mixed-radix digit reversal. For example, the elements of a sequence may be indexed by a number expressed in a mixed radix, whose digits are reversed by a permutation.

A permutation that generalizes the bit-reversal permutation by reversing contiguous blocks of bits within the binary representations of the indices thereof may be used to interleave two data sequences of the same length in place.

There may be two extensions of the bit-reversal permutation to sequences of any length. The extensions coincide with bit reversal for sequences whose length is a power of 2. The purpose thereof may be to separate adjacent items in a sequence for the efficient operation of the Kaczmarz algorithm.

The first one of the extensions, called Efficient Ordering, operates on composite numbers, and Efficient Ordering may be based on decomposing a number into prime components.

The second extension, called extended bit-reversal (EBR), is similar to bit reversal. For example, when an array with a size of n is given, EBR fills the array with a permutation of numbers in a range of 0, . . . , n−1 in linear time. Consecutive numbers may be separated in the permutation by at least $\lfloor n/4 \rfloor$ positions.

3.3.1. Proposal #3-1 (Bit-Reversal Method #1)

To configure frequency RE offsets for a specific PRS resource that occupies M symbols (where M is a natural number greater than or equal to 1), where each symbols has a comb-N type frequency RE pattern configured therefor, a bit-reversal method of a bit string composed of B bits may be used (where B is a natural number more than or equal to 1).

The comb offset values for the second to last OFDM symbols occupied by a specific PRS resource configured/indicated by the BS/location server/LMF may be configured/indicated as reverse bit string values, depending on the comb offset value (e.g., the comb offset value for the first symbol (e.g., the first symbol among the symbols occupied by the specific PRS resource)), the comb size, the number of symbols, and/or the symbol indices of the PRS resource.

For example, the BS/location server/LMF may configure/indicate/determine the frequency RE offset (and/or comb offset) for each symbol for the UE by adding or subtracting different reversed bit string values (sequentially for each symbol) from the frequency RE offset value (and/or comb offset value) indicated by the BS/location server/LMF for the specific PRS resource.

That is, to configure/determine the frequency RE offset values (and/or comb offset values) for other symbols based on the frequency RE offset value (and/or comb offset value) for a specific OFDM symbol, which is indicated/configured by the BS/location server/LMF, reversed bit string values may be used as relative frequency RE offset values (and/or comb offset values) to be added to or subtracted from the frequency RE offset value (and/or comb offset value).

In other words, the frequency RE offset values (and/or comb offset values) for the other OFDM symbols except for the specific OFDM symbol among the OFDM symbols occupied by the PRS resource may be determined by adding and/or subtracting the relative frequency RE offset values (and/or comb offset values) from the frequency RE offset value (and/or comb offset value) for the specific OFDM symbol (e.g., the first OFDM symbol) among the OFDM symbols occupied by the PRS resource. In this case, the reversed bit string values may be used as the relative frequency RE offset values (and/or comb offset values).

For example, assuming that two bits are used to indicate/determine/configure the comb offsets (two bits for indication/determination/configuration of relative comb offsets), a bit string, a reversed bit string value, and/or a relative comb offset per symbol may be determined as shown in Table 6 below (relative comb offsets based on bit reversal (two bits)).

TABLE 6

| Bit-string | Reverse bit-string | Relative Comb-offset value before modulo | Relative Comb-offset value considering Comb-size = "N" | Symbols to which relative offsets are applied among symbols configured for PRS resource |
|---|---|---|---|---|
| 00 | 00 | 0 | $(\hat{O}_{Comb} + 0)$ mod N | (Nn − 3)-th symbol |
| 01 | 10 | 2 | $(\hat{O}_{Comb} + 2)$ mod N | (Nn − 2)-th symbol |
| 10 | 01 | 1 | $(\hat{O}_{Comb} + 1)$ mod N | (Nn − 1)-th symbol |
| 11 | 11 | 3 | $(\hat{O}_{Comb} + 3)$ mod N | (Nn)-th symbol |

In Table 6, $\hat{O}_{Comb}$ may denote the frequency RE offset (and/or comb offset) for the specific symbol of the specific PRS resource indicated by the BS/location server/LMF to the UE. In Table 6, n (n>=1) (or n>=0) may denote the first OFDM symbol to the last OFDM symbol occupied by the PRS resource. For example, n may be the index (1 to 14 and/or 0 to 13) of each symbol defined from the first to last OFDM symbol occupied by the PRS resource.

In Table 6, it is defined which relative comb offset value is applied to which symbol, but the relative comb offset value applied to each symbol may vary, which may also be included in various embodiments of the present disclosure. For example, (assuming that N=4) in Table 6, a relative comb offset value of 2 may be applied to the 4n-th symbol, and a relative comb offset value of 3 may be applied to the (4n−2)-th symbol.

The final frequency RE offset (and/or comb offset) used for each symbol may be determined as follows. First, a value is obtained by adding a relative offset to the frequency RE offset (and/or comb offset) indicated by the BS/location server/LMF, and the obtained value is divided by the comb size. The remainder may be determined as the final frequency RE offset. For example, the fourth column of Table 6 may be actually used relative comb offsets.

For example, it may be assumed that the PRS resource consists of two OFDM symbols, and the frequency RE pattern of each symbol has a comb size of 4. In addition, it may be assumed that the BS/location server/LMF indicates a comb offset of 2 for the first OFDM symbol among the two OFDM symbols.

In this case, it may be seen from Table 6 that the relative comb offset values for the first and second symbols are 0 and 2, respectively. Specifically, when N=4 and n=1, the relative comb offset values for the first, second, third, and fourth symbols may be defined based on Table 6. Since the two-symbol PRS is assumed, 0 and 2 may be used as the relative comb offset values for the first and second symbols among the relative comb offset values defined by Table 6.

For example, the frequency RE offset for the first symbol may be obtained by adding 0 to the indicated comb offset value 2, and the frequency RE offset for the second symbol may be determined as a remainder obtained by dividing a value obtained by adding 2 to the indicated comb offset value 2 by 4. That is, the frequency RE offset for the first symbol may be (2+0) mod 4=2, and the frequency RE offset for the second symbol may be (2+2) mod 4=0.

For example, when the comb size is less than or equal to 4, two bits may be suitable to indicate/determine/configure the comb offset. For example, when the comb size is 6, 8, or higher, the frequency RE offset value (and/or comb offset value) may needs to be greater than 3.

For example, assuming that three bits are used to indicate/determine/configure the comb offsets, a bit string, a reversed bit string value, and/or a relative comb offset per symbol may be determined as shown in Table 7 below (relative comb offsets based on bit reversal (three bits)). For example, a method having the same or similar effects as the above-described comb offset determining method based on Table 6 described above may be applied as a method of determining comb offsets based on Table 7.

For a PRS resource having a comb size of N configured therefor, it may be considered to use $B=\lceil \log_2 N \rceil$ bits or use the $B=\lceil \log_2 N \rceil$ bits as a bit string for configuring/determining frequency RE offsets (and/or comb offsets).

If a comb size of N is a natural number that is not expressed as a power of 2, it may be considered to use the $B=\lceil \log_2 N \rceil$. Alternatively, it may be considered to selectively use N bits of $2^B$ bit strings, instead of using all the $8=\lceil \log_2 N \rceil$ bits.

Considering the relative comb offset for each symbol, the comb offset used for the n-th symbol occupied by the PRS resource may be determined/configured as follows.

$$O_{Comb}(n^{th}\ symbol) = (\hat{O}_{Comb} + \text{Relative\_offset}(n^{th}\ symbol)) \bmod N$$

$\hat{O}_{Comb}$: $\hat{O}_{Comb}$ denotes a specific comb offset value indicated/configured by the BS/location server/LMF to the UE for the PRS resource. For example, $\hat{O}_{Comb}$ may be the comb offset value for the first OFDM symbol among one or multiple OFDM symbols included in the PRS resource.

Relative_offset($n^{th}$ symbol): Relative_offset($n^{th}$ symbol) denotes a relative comb offset for the n-th symbol included in the PRS resource (where n>=1). Relative_offset($n^{th}$ symbol) may be a value defined from the first to last OFDM symbol occupied by the PRS resource.

In the above embodiments of the present disclosure, the methods of determining relative comb offsets for other symbols included in a PRS resource based on the symbol index (or order) with respect to the comb offset value for the first symbol of the PRS resource, which is indicated to the UE, have been described.

Hereinafter, methods in which comb offsets for other symbols are configured/indicated to be dependent on a comb offset value indicated to the UE will be described in various embodiments of the present disclosure.

3.3.2. Proposal #3-2 (Bit-Reversal Method #2)

To configure frequency RE offsets for a specific PRS resource that occupies M symbols (where M is a natural number greater than or equal to 1) where each symbol has a comb-N type frequency RE pattern configured therefor, a bit-reversal method of a bit string composed of B bits may be used (where B is a natural number more than or equal to 1).

For example, it may be considered that comb offsets of the PRS resource are configured/indicated with three bits (which may have a value corresponding to 0 to 7 in decimal).

For example, Table 8 below (relative comb offsets based on bit reversal (three bits)) may be considered.

TABLE 7

| Bit-string | Reverse bit-string | Relative Comb-offset value before modulo | Relative Comb-offset value considering Comb-size = "N" | Symbols to which relative offsets are applied among symbols configured for PRS resource |
|---|---|---|---|---|
| 000 | 000 | 0 | $(\hat{O}_{Comb} + 0)$ mod N | (Nn − 7)-th symbol |
| 001 | 100 | 4 | $(\hat{O}_{Comb} + 4)$ mod N | (Nn − 6)-th symbol |
| 010 | 010 | 2 | $(\hat{O}_{Comb} + 2)$ mod N | (Nn − 5)-th symbol |
| 011 | 110 | 6 | $(\hat{O}_{Comb} + 6)$ mod N | (Nn − 4)-th symbol |
| 100 | 001 | 1 | $(\hat{O}_{Comb} + 1)$ mod N | (Nn − 3)-th symbol |
| 101 | 101 | 5 | $(\hat{O}_{Comb} + 5)$ mod N | (Nn − 2)-th symbol |
| 110 | 011 | 3 | $(\hat{O}_{Comb} + 3)$ mod N | (Nn − 1)-th symbol |
| 111 | 111 | 7 | $(\hat{O}_{Comb} + 7)$ mod N | (Nn)-th symbol |

TABLE 8

| Row index | Bit-string | Reverse bit-string | Relative Comb-offset value before modulo | Relative Comb-offset value Considering Comb-size = "N" |
|---|---|---|---|---|
| 1 | 000 | 000 | 0 | 0 mod N |
| 2 | 001 | 100 | 4 | 4 mod N |
| 3 | 010 | 010 | 2 | 2 mod N |
| 4 | 011 | 110 | 6 | 6 mod N |
| 5 | 100 | 001 | 1 | 1 mod N |
| 6 | 101 | 101 | 5 | 5 mod N |
| 7 | 110 | 011 | 3 | 3 mod N |
| 8 | 111 | 111 | 7 | 7 mod N |

For example, when the PRS resource consists of two symbols:

The reversed bit string of the comb offset value for one specific symbol, which is indicated by the BS/location server/LMF, may be used as the comb offset value for the other symbol. For example, if 3 (011) is indicated to the UE as the comb offset value for the first symbol, the UE may recognize that the comb offset value for the other symbol is 5 (110) or 5 mod N.

In this case, if the bit string of the indicated comb offset value is the same as the reserved bit string thereof, a value obtained by adding a specific value (e.g., 1) to the indicated comb offset value may be used as the comb offset for the other symbol. Additionally/alternatively, the reversed bit string of the value obtained by adding the specific value (e.g., 1) to the indicated comb offset value may be used as the comb offset for the other symbol.

When the PRS resource consists of M symbols (where M is a natural number greater than or equal to 2):

With respect to the comb offset (and/or frequency RE offset) value indicated for the first symbol, the comb offsets for the remaining N−1 (M−1?) symbols included in the PRS resource may be indicated/configured as reversed bit strings corresponding to values obtained by sequentially adding or subtracting a specific value to the comb offset value of the first symbol (for example, the comb offset value may be added by 1 depending on the symbol index). In this case, for example, revered bit strings corresponding to remainders obtained by dividing the values obtained by sequentially adding or subtracting the specific value to the indicated comb offset value by the comb size (e.g., N) may be used.

For example, it may be assumed that for a PRS resource consisting of four symbols, the UE is configured/indicated with a comb offset of 3 (011) and a comb size of N=8. In this case, 1(001), 5(101), and 3(011), which are reversed bit strings of 4(100) mod N, 5(101) mod N, and 6(110) mod N, respectively, may be sequentially indicated/configured as comb offsets.

For example, when a reversed bit string is used as the comb offset for a specific symbol, if the reversed bit string is the same as the comb offset value of the previous symbol, a value obtained by adding or subtracting the specific value and/or a value obtained by dividing the value obtained by adding or subtracting the specific value by the comb size may be used as comb offsets for other symbols.

Additionally/alternatively, the reverse bit of the comb offset value indicated by the BS/location server/LMF may be used as the comb offset for the second OFDM symbol occupied/used by the PRS resource. For the remaining N−2 (M−2?) symbols, reserved bit strings corresponding to values obtained by sequentially adding or subtracting the specific value to the indicated comb offset may be indicated/configured (for example, the comb offset value may be added by 1 depending on the symbol index). In this case, for example, revered bit strings corresponding to remainders obtained by dividing the values obtained by sequentially adding or subtracting the specific value to the indicated comb offset value by the comb size (e.g., N) may be used.

For example, it may be assumed that for a PRS resource consisting of four symbols, the UE is configured/indicated with a comb offset of 3 (011) and a comb size of N=8. In this case, for example, 6 (110), which is a reserved bit string of the indicated comb offset 3 (011), may be used as the comb offset for the second symbol. 1(001), which is a reserved bit string of 4(100) obtained by adding 1 to 3(011), may be used as the comb offset for the third symbol. 5(101), which is a reserved string of 5(101) obtained by adding 2 to 3(011), may be the comb offset for the fourth symbol.

For example, when a reversed bit string is used as the comb offset for a specific symbol, if the reversed bit string is the same as the comb offset value of the previous symbol, a value obtained by adding or subtracting the specific value and/or a value obtained by dividing the value obtained by adding or subtracting the specific value by the comb size may be used as comb offsets for other symbols.

3.3.3. Proposal #3-3 (Truncated Bit-Reversal)

An SRS resource mentioned in the description of various embodiments of the present disclosure may be an SRS (resource) for UE positioning (SRS for positioning) configured by the BS/location server/LMF for the UE.

For example, there is a higher layer parameter for SRS resources configured to define the usage/use of the SRS in an SRS resource set, and the UE may be informed that the usage parameter configured in units of SRS resource sets is used for "UE positioning".

To configure frequency RE offsets (and/or comb offsets) for a specific PRS/SRS resource that occupies M symbols (where M is a natural number greater than or equal to 1) where each symbol has a comb-N type frequency RE pattern configured therefor, a bit-reversal method of a bit string composed of B bits may be used (where B is a natural number more than or equal to 1). However, when the comb size is not expressed as a power of 2, and more particularly, when a comb size of "N" is smaller than $2^B$, it may be difficult to apply $2^B$ bit reversal as it is because the frequency RE offsets (and/or comb offsets) are less than N.

In this case, according to various embodiments of the present disclosure, the remaining values except for values greater than or equal to the comb size (N) among relative frequency RE offsets (and/or comb offsets) expressed by the $2^B$ bit reversal may be used sequentially. According to various embodiments of the present disclosure, the amount of computation for reordering except for removal of the values after bit reversal calculation may be reduced.

For example, it may be considered that the PRS/SRS resource is configured to have a comb size of 6 and includes 6 OFDM symbols. In this case, three-bit bit-reversal may be considered.

For example, Table 9 below (relative comb offsets based on bit reversal (three bits)) may be considered.

TABLE 9

| Bit-string | Reverse bit-string | Relative Comb-offset value before modulo | Resultant Comb-offset value Considering indicated comb-offset ($\hat{O}_{Comb}$) and Comb-size (N) |
|---|---|---|---|
| 000 | 000 | 0 | ($\hat{O}_{Comb}$ + 0) mod N |
| 001 | 100 | 4 | ($\hat{O}_{Comb}$ + 4) mod N |
| 010 | 010 | 2 | ($\hat{O}_{Comb}$ + 2) mod N |
| 011 | 110 | 6 | ($\hat{O}_{Comb}$ + 6) mod N |
| 100 | 001 | 1 | ($\hat{O}_{Comb}$ + 1) mod N |
| 101 | 101 | 5 | ($\hat{O}_{Comb}$ + 5) mod N |

TABLE 9-continued

| Bit-string | Reverse bit-string | Relative Comb-offset value before modulo | Resultant Comb-offset value Considering indicated comb-offset ($\hat{O}_{Comb}$) and Comb-size (N) |
|---|---|---|---|
| 110 | 011 | 3 | ($\hat{O}_{Comb}$ + 3) mod N |
| 111 | 111 | 7 | ($\hat{O}_{Comb}$ + 7) mod N |

Referring to Table 9, 0, 4, 2, 6, 1, 5, 3, and 7 may be sequentially considered as relative comb offset values. Such frequency RE offset values may be applied to a PRS/SRS resource having a comb size of 8 and including 8 OFDM symbols.

To apply these frequency RE offset values to the comb-6 PRS/SRS resource, 0, 4, 2, 1, 5, and 3 may be configured/indicated/determined/used as relative frequency RE offset values (and/or comb offset values) by excluding numbers greater than or equal to 6.

That is, these relative comb offset values may be added to the frequency RE offset value (and/or comb offset value) for the first symbol of the PRS/SRS resource, $\hat{O}_{comb}$, which is indicated to the UE by the BS/location server/LMF, and then values obtained by performing 6 (N=6) modulo operation on the added values may be used as comb offset values for the first to sixth symbols.

That is, Relative_offset(n) of the equation $O_{Comb}(n^{th}$ symbol$)=(\hat{O}_{Comb}+$Relative_offset($n^{th}$ symbol)) mod N may be sequentially determined as 0, 4, 2, 1, 5, and 3 as shown in Table 10 (relative comb offsets based on truncated bit reversal (truncated three bits)).

TABLE 10

| n | Relatives_offset(n) | Resultant Comb-offset value Considering indicated comb-offset ($\hat{O}_{Comb}$) and Comb-size (6) |
|---|---|---|
| 1 | 0 | ($\hat{O}_{Comb}$ + 0) mod 6 |
| 2 | 4 | ($\hat{O}_{Comb}$ + 4) mod 6 |
| 3 | 2 | ($\hat{O}_{Comb}$ + 2) mod 6 |
| 4 | 1 | ($\hat{O}_{Comb}$ + 1) mod 6 |
| 5 | 5 | ($\hat{O}_{Comb}$ + 5) mod 6 |
| 6 | 3 | ($\hat{O}_{Comb}$ + 3) mod 6 |

The notation used in Table 10 is defined as follows.
n∈{1, 2, 3, . . . , M}: $n^{th}$ symbol: n∈{1, 2, 3, . . . , M}: $n^{th}$ symbol denotes the n-th symbol of the PRS/SRS resource, where M is a natural number.
Relative_offset(n): Relative_offset(n) denotes a relative comb offset for the n-th symbol of the PRS/SRS resource. Relative_offset(n) may be defined from the first OFDM symbol to the last symbol occupied by the PRS/SRS resource.

For example, when the comb-6 PRS/SRS resource occupies 6 OFDM symbols, 6 relative frequency RE offsets may be used for each symbol.

For example, when the comb-6 PRS/SRS resource occupies L OFDM symbols (where L is a natural number less than 6), the first L values among 0, 4, 2, 1, 5, and 3 may be configured/indicated as relative frequency RE offsets. Additionally/alternatively, the last L values may be configured/indicated as relative frequency RE offsets. Additionally/alternatively, L values may be selected and used from among the above relative frequency RE offsets according to specific rules.

As another example, it may be considered that a PRS/SRS resource is configured to have a comb size of 12 and includes 12 OFDM symbols. In this case, since the comb size is greater than three bits, a 4-bit bit reversal operation may be considered to determine relative frequency RE offsets.

For example, Table 11 below may be considered therefor (relative comb offsets based on bit reversal (four bits)).

TABLE 11

| Bit-string | Reverse bit-string | Relative Comb-offset value before modulo | Resultant Comb-offset value Considering indicated comb-offset ($\hat{O}_{Comb}$) and Comb-size (N) |
|---|---|---|---|
| 0000 | 0000 | 0 | ($\hat{O}_{Comb}$ + 0) mod N |
| 0001 | 1000 | 8 | ($\hat{O}_{Comb}$ + 8) mod N |
| 0010 | 0100 | 4 | ($\hat{O}_{Comb}$ + 4) mod N |
| 0011 | 1100 | 12 | ($\hat{O}_{Comb}$ + 12) mod N |
| 0100 | 0010 | 2 | ($\hat{O}_{Comb}$ + 2) mod N |
| 0101 | 1010 | 10 | ($\hat{O}_{Comb}$ + 10) mod N |
| 0110 | 0110 | 6 | ($\hat{O}_{Comb}$ + 6) mod N |
| 0111 | 1110 | 14 | ($\hat{O}_{Comb}$ + 14) mod N |
| 1000 | 0001 | 1 | ($\hat{O}_{Comb}$ + 1) mod N |
| 1001 | 1001 | 9 | ($\hat{O}_{Comb}$ + 9) mod N |
| 1010 | 0101 | 5 | ($\hat{O}_{Comb}$ + 5) mod N |
| 1011 | 1101 | 13 | ($\hat{O}_{Comb}$ + 13) mod N |
| 1100 | 0011 | 3 | ($\hat{O}_{Comb}$ + 3) mod N |
| 1101 | 1011 | 11 | ($\hat{O}_{Comb}$ + 11) mod N |
| 1110 | 0111 | 7 | ($\hat{O}_{Comb}$ + 7) mod N |
| 1111 | 1111 | 15 | ($\hat{O}_{Comb}$ + 15) mod N |

In Table 11, when 4-bit bit reversal is used, 0, 8, 4, 12, 2, 0, 10, 6, 14, 1, 9, 5, 13, 3, 11, 7, and 15 may be used as relative frequency RE offset (and/or relative comb offset) values for each symbol of the PRS/SRS resource. For example, these frequency RE offset values may be applied to a PRS/SRS resource having a comb size of 16 and including 16 OFDM symbols. For example, the PRS/SRS resource composed of 16 OFDM symbols may be one PRS/SRS resource configured across slots.

To apply these frequency RE offset values to the comb-12 PRS/SRS resource, 0, 8, 4, 2, 10, 6, 1, 9, 5, 3, 11, and 7 may be configured/indicated/determined/used as relative frequency RE offset values (and/or comb offset values) by excluding numbers greater than or equal to 12.

For example, these relative comb offset values may be added to the frequency RE offset value (and/or comb offset value) for the first symbol of the PRS/SRS resource, $\hat{O}_{comb}$, which is indicated to the UE by the BS/location server/LMF, and then values obtained by performing 12 (N=12) modulo operation on the added values may be used as comb offset values for the first to twelfth symbols.

That is, (Relative_offset(n) of?) the equation $O_{comb}(n^{th}$ symbol$)=(\hat{O}_{comb}+$Relative_offset($n^{th}$ symbol)) mod N may be sequentially determined as 0, 8, 4, 2, 10, 6, 1, 9, 5, 3, 11, and 7 as shown in Table 12 (relative comb offsets based on truncated bit reversal (truncated three bits)).

TABLE 12

| n | Relative_offset(n) | Resultant Comb-offset value Considering indicated comb-offset ($\hat{O}_{Comb}$) and Comb-size (12) |
|---|---|---|
| 1 | 0 | ($\hat{O}_{Comb}$ + 0) mod 12 |
| 2 | 8 | ($\hat{O}_{Comb}$ + 8) mod 12 |
| 3 | 4 | ($\hat{O}_{Comb}$ + 4) mod 12 |

TABLE 12-continued

| n | Relative_offset(n) | Resultant Comb-offset value Considering indicated comb-offset ($\tilde{O}_{Comb}$) and Comb-size (12) |
|---|---|---|
| 4 | 2 | ($\tilde{O}_{Comb}$ + 2) mod 12 |
| 5 | 10 | ($\tilde{O}_{Comb}$ + 10) mod 12 |
| 6 | 6 | ($\tilde{O}_{Comb}$ + 6) mod 12 |
| 7 | 1 | ($\tilde{O}_{Comb}$ + 1) mod 12 |
| 8 | 9 | ($\tilde{O}_{Comb}$ + 9) mod 12 |
| 9 | 5 | ($\tilde{O}_{Comb}$ + 5) mod 12 |
| 10 | 3 | ($\tilde{O}_{Comb}$ + 3) mod 12 |
| 11 | 11 | ($\tilde{O}_{Comb}$ + 11) mod 12 |
| 12 | 7 | ($\tilde{O}_{Comb}$ + 7) mod 12 |

The notation used in Table 12 is defined as follows.

n∈{1, 2, 3, . . . , M}: $n^{th}$ symbol: n∈{1, 2, 3, . . . , M}: $n^{th}$ symbol denotes the n-th symbol of the PRS/SRS resource, where M is a natural number.

Relative_offset(n): Relative_offset(n) denotes a relative comb offset for the n-th symbol of the PRS/SRS resource. Relative_offset(n) may be defined from the first OFDM symbol to the last symbol occupied by the PRS/SRS resource.

For example, when the comb-12 PRS/SRS resource occupies 12 OFDM symbols, 12 relative frequency RE offsets (and/or relative comb offsets) may be used for each symbol.

For example, when the comb-12 PRS/SRS resource occupies L OFDM symbols (where L is a natural number less than 12), the first L values among the relative frequency RE offsets (and/or relative comb offsets) may be configured/indicated as relative frequency RE offsets. Additionally/alternatively, the last L values may be configured/indicated as relative frequency RE offsets. Additionally/alternatively, L values may be selected and used from among the above relative frequency RE offsets according to specific rules.

Illustrative Example

Figure 19:
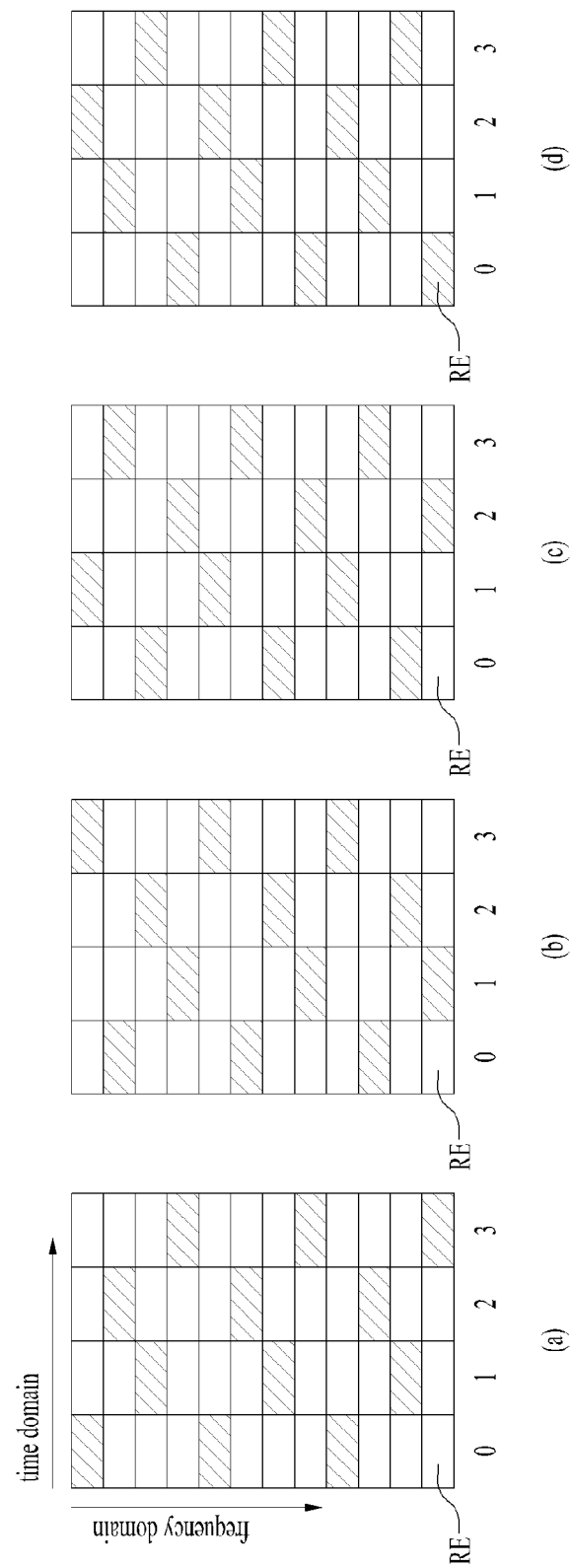
FIG. 19 is a diagram illustrating an exemplary PRS resource configuration according to various embodiments of the present disclosure.

FIG. 19 is a diagram illustrating an exemplary PRS resource configuration according to various embodiments of the present disclosure.

FIG. 19 shows the PRS resource configuration in which a PRS resource occupies four OFDM symbols and has a comb size of 4, but various embodiments of the present disclosure are not limited thereto. For example, according to various embodiments of the present disclosure, a PRS resource may occupy up to 12 consecutive OFDM symbols and have a comb size of 2, 4, 6, 12, or the like.

In FIG. 19, the index of each symbol may be a relative index with respect to the first OFDM symbol among the four OFDM symbols included in the PRS resource. That is, for example, the index of each symbol may be denoted by $l-l_{start}^{PRS}$, where l is an OFDM symbol index in a slot, and $l_{start}^{PRS}$ is the first slot (symbol?) index of the PRS resource in the slot.

Referring to FIG. 19, the RE offset of the PRS resource configured with the comb pattern may be determined as a value obtained by performing a mod 4 operation on a value obtained by adding an RE offset configured/indicated/signaled by the BS/location server/LMF to a predefined frequency offset of {0, 2, 1, 3}.

For example, referring to FIG. 19(a), when RE offset=0 is configured/indicated/signaled, the PRS may be configured to have a staggered RE pattern corresponding to {0, 0, 0, 0}+{0, 2, 1, 3}={0, 2, 1, 3}–mod 4–>{0, 2, 1, 3}.

For example, referring to FIG. 19(b), when RE offset=1 is configured/indicated/signaled, the PRS may be configured to have a staggered RE pattern corresponding to {1, 1, 1, 1}+{0, 2, 1, 3}={1, 3, 2, 4}–mod 4–>{1, 3, 2, 0}.

For example, referring to FIG. 19(b), when RE offset=2 is configured/indicated/signaled, the PRS may be configured to have a staggered RE pattern corresponding to {2, 2, 2, 2}+{0, 2, 1, 3}={2, 4, 3, 5}–mod 4–>{2, 0, 3, 1}.

For example, referring to FIG. 19(d), when RE offset=3 is configured/indicated/signaled, the PRS may be configured to have a staggered RE pattern corresponding to {3, 3, 3, 3}+{0, 2, 1, 3}={3, 5, 4, 6}–mod 4–>{3, 1, 0, 2}.

According to various embodiments of the present disclosure, the RE offset for each OFDM symbol occupied by a PRS resource configured with a comb pattern may be determined as a value obtained by performing a modular operation on a value obtained by adding a configured/indicated/signaled RE offset to a predefined frequency offset.

For example, the predefined frequency offset may have a predetermined value for each OFDM symbol occupied by the PRS resource.

For example, the predefined frequency offset may be a function of the index of each OFDM symbol occupied by the PRS resource (more precisely, the relative index with respect to the first OFDM symbol among OFDM symbols occupied by the PRS resource) and/or comb size. That is, for example, a preconfigured corresponding relation may be satisfied between the predefined frequency offset and the index of each OFDM symbol occupied by the PRS resource (more precisely, the relative index with respect to the first OFDM symbol among the OFDM symbols occupied by the PRS resource) and/or comb size.

For example, the RE offset of the PRS resource may be defined by $(k_{offset}^{PRS})$ mod $K_{comb}^{PRS}$, where $k_{offset}^{PRS}$ is the RE offset configured/indicated/signaled by the BS/location server/LMF, k' is the predefined frequency offset, and $K_{comb}^{PRS}$ is the comb size. For example, the comb size may be configured/indicated/signaled by the BS/location server/LMF and may have a value of 2, 4, 6, 12, etc.

For example, a corresponding relation may be predefined between the time length of the PRS resource (the number of OFDM symbols occupied by the PRS resource) and a configurable comb size. For example, {PRS resource time length, comb size} may be one of {2, 2}, {4, 2}, {6, 2}, {12, 2}, {4, 4}, {12, 4}, {6, 6}, {12, 6}, or {12, 12}.

For example, the preconfigured corresponding relation between the predefined frequency offset and the index of each OFDM symbol occupied by the PRS resource (more precisely, the relative index with respect to the first OFDM symbol among the OFDM symbols occupied by the PRS resource) and/or comb size may be summarized as shown in Table 13 below.

TABLE 13

| | Symbol number within the downlink PRS resource $I - I_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

In Table 13, a value related to each symbol number and comb size may mean a frequency offset value corresponding to each symbol number and comb size.

Figure 20:
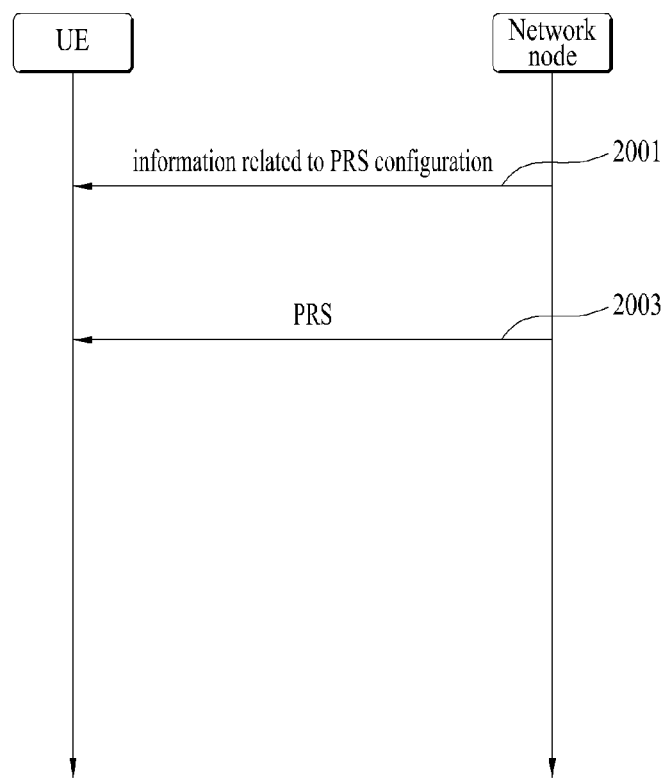
FIG. 20 is a diagram schematically illustrating an operation method for a UE and a network node according to various embodiments of the present disclosure.

FIG. 20 is a diagram schematically illustrating an operation method for a UE and a network node according to various embodiments of the present disclosure.

Figure 21:
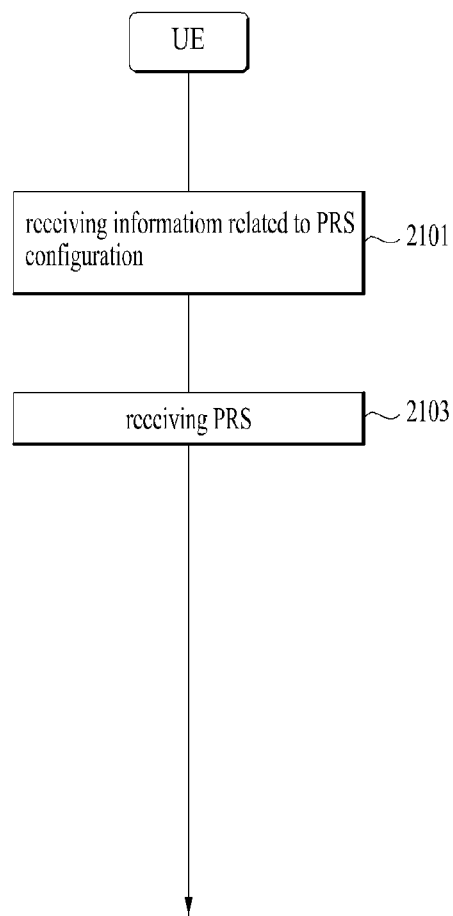
FIG. 21 is a flowchart illustrating an operation method for a UE according to various embodiments of the present disclosure.

FIG. 21 is a flowchart illustrating an operation method for a UE according to various embodiments of the present disclosure.

Figure 22:
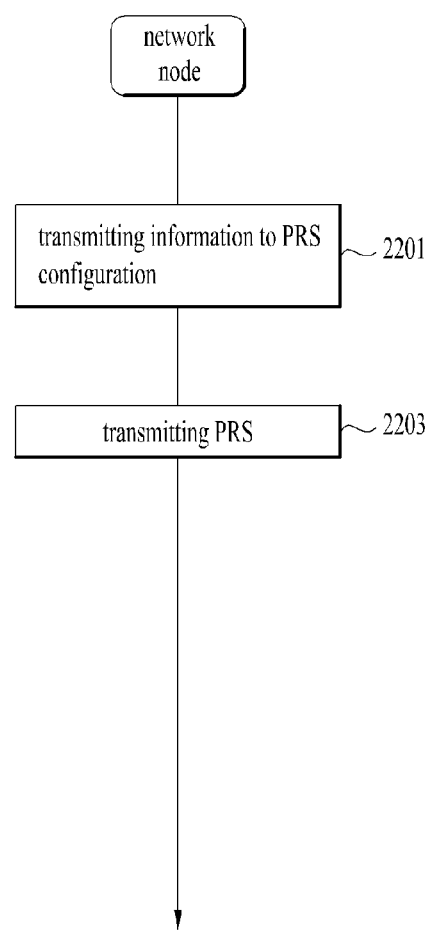
FIG. 22 is a flowchart illustrating an operation method for a network node according to various embodiments of the present disclosure.

FIG. 22 is a flowchart illustrating an operation method for a network node according to various embodiments of the present disclosure. For example, the network node may be a location server, an LMF, a TP, and/or any device performing the same work.

Referring to FIGS. 20 to 22, in operations 2001, 2101, and 2201 according to exemplary embodiments, the network node may transmit information related to a PRS resource configuration, and the UE may receive the information.

In operations 2003, 2103, and 2105 (2203?) according to exemplary embodiments, the network node may transmit a PRS mapped to a plurality of REs configured as a comb in the frequency domain based on the PRS resource configuration, and the UE may the PRS based on the PRS resource configuration.

For example, the plurality of REs may be obtained based on (i) information on a first offset included in the PRS resource configuration, (ii) a predetermined second offset, and (iii) the comb size of the comb.

For example, the second offset may include the frequency offset for each of one or more OFDM symbols occupied by the plurality of REs among OFDM symbols included in one slot.

For example, (i) the frequency offset for each of the one or more OFDM symbols, (ii) the index for each of the one or more OFDM symbols, and (iii) the comb size may satisfy a predetermined corresponding relation.

More specific operations of the UE and/or the TP and/or the location server according to the above-described various embodiments of the present disclosure may be described and performed based on the descriptions of clause 1 to clause 3.

Examples of the above-described proposed methods may also be included as one of various embodiments of the present disclosure, and thus may be considered to be some proposed methods. While the proposed methods may be independently implemented, some of the proposed methods may be combined (or merged). It may be regulated that information indicating whether to apply the proposed methods (or information about the rules of the proposed methods) is indicated by a signal (e.g., a physical-layer signal or a higher-layer signal) predefined for the UE by the BS.

4. Exemplary Configurations of Devices Implementing Various Embodiments of the Present Disclosure 4.1. Exemplary Configurations of Devices to which Various Embodiments of the Present Disclosure are Applied FIG. 23 is a diagram illustrating devices that implement various embodiments of the present disclosure.

Figure 23:
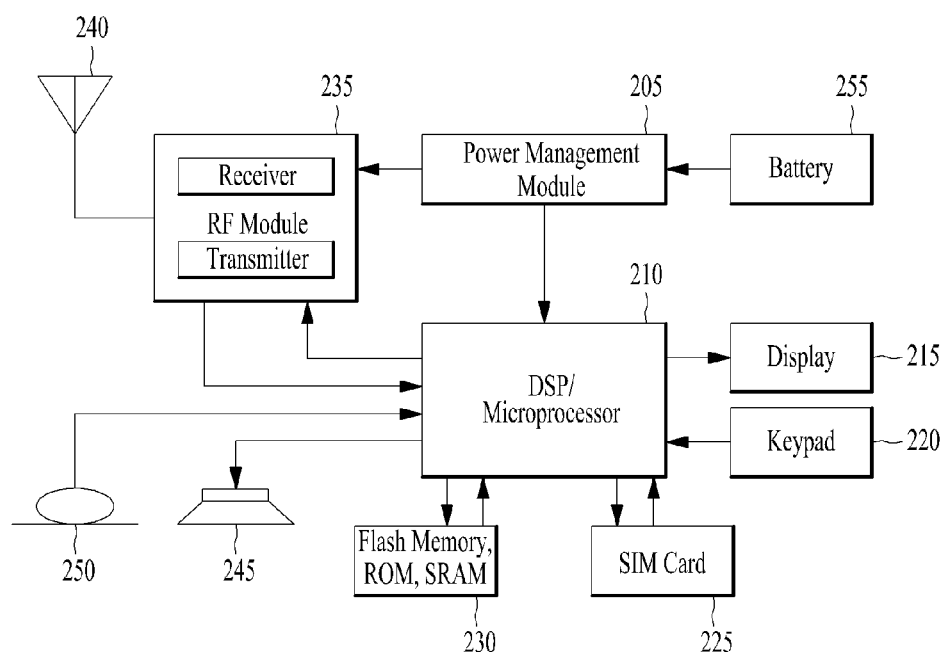
FIG. 23 illustrates an exemplary communication system to which various embodiments of the present disclosure are applied.

The devices illustrated in FIG. 23 may be a UE and/or a BS (e.g., eNB or gNB) adapted to perform the aforedescribed mechanisms, or any devices performing the same operation.

Referring to FIG. 23, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 23 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 23 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

A location server, an LMF, a BS, a TP, and/or any device performing the same work may be referred to as a network node.

According to various embodiments of the present disclosure, one or more processors included in the UE (or one or more processors of the communication device included in the UE) may receive information related to a PRS resource configuration.

According to various embodiments of the present disclosure, the one or more processors included in the UE may receive a PRS mapped to a plurality of REs configured as a comb in the frequency domain based on the PRS resource configuration.

In an exemplary embodiment, the plurality of REs may be obtained based on (i) information on a first offset included in the PRS resource configuration, (ii) a predetermined second offset, and (iii) the comb size of the comb.

In an exemplary embodiment, the second offset may include the frequency offset for each of one or more OFDM symbols occupied by the plurality of REs among OFDM symbols included in one slot.

In an exemplary embodiment, (i) the frequency offset for each of the one or more OFDM symbols, (ii) the index for each of the one or more OFDM symbols, and (iii) the comb size may satisfy a predetermined corresponding relation.

According to various embodiments of the present disclosure, one or more processors included in the network node (or one or more processors of the communication device included in the network node) may transmit information related to a PRS resource configuration.

According to various embodiments of the present disclosure, the one or more processors included in the network node may transmit a PRS mapped to a plurality of REs configured as a comb in the frequency domain based on the PRS resource configuration.

In an exemplary embodiment, the plurality of REs may be obtained based on (i) information on a first offset included in the PRS resource configuration, (ii) a predetermined second offset, and (iii) the comb size of the comb.

In an exemplary embodiment, the second offset may include the frequency offset for each of one or more OFDM symbols occupied by the plurality of REs among OFDM symbols included in one slot.

In an exemplary embodiment, (i) the frequency offset for each of the one or more OFDM symbols, (ii) the index for each of the one or more OFDM symbols, and (iii) the comb size may satisfy a predetermined corresponding relation.

More specific operations of the processor included in the UE and/or the BS and/or the location server according to the above-described various embodiments of the present disclosure may be described and performed based on the descriptions of clause 1 to clause 3.

Unless contradicting each other, various embodiments of the present disclosure may be implemented in combination. For example, (a processor or the like included in) a UE and/or a BS and/or a location server according to various embodiments of the present disclosure may implement the embodiments described in clause 1 to clause 3 in combination, unless contradicting each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 24:
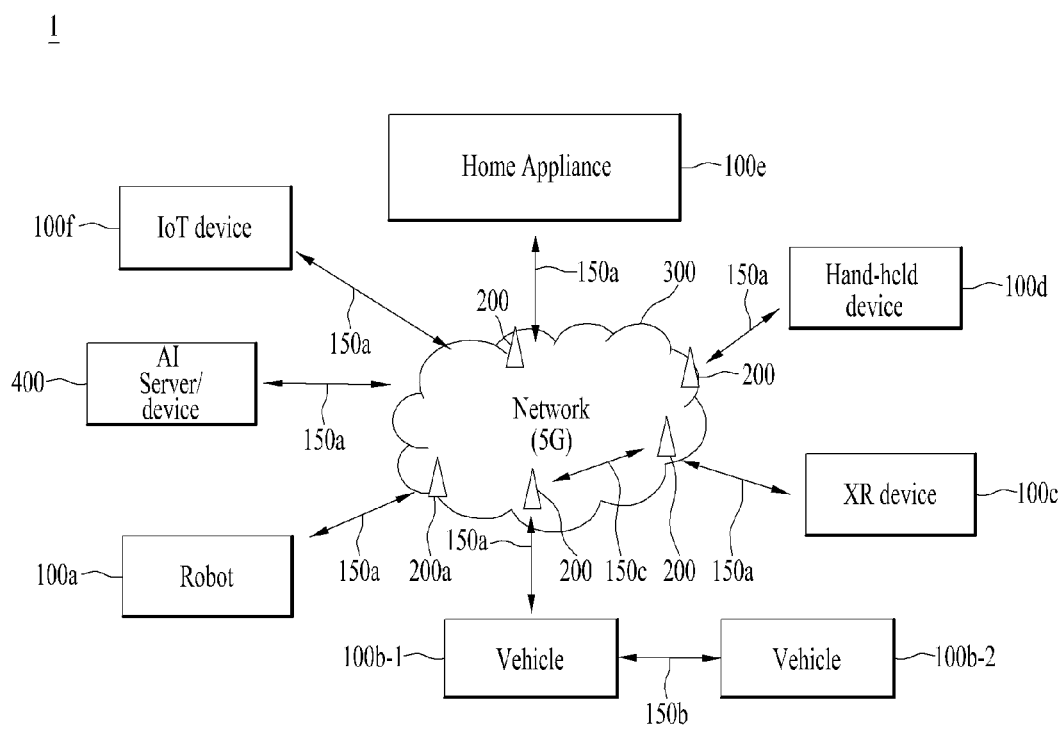
FIG. 24 illustrates exemplary wireless devices to which various embodiments of the present disclosure are applicable.

FIG. 24 illustrates exemplary wireless devices to which various embodiments of the present disclosure are applicable.

Referring to FIG. 24, the communication system 1 applicable to various embodiments of the present disclosure includes wireless devices, BSs, and a network. Herein, the wireless device refers to a device performing communication based on a radio access technology (e.g., 5G NR, LTE, etc.) and may be referred to as a communication/radio/5G device. The wireless devices may include, but not limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality/virtual reality/mixed reality (AR/VR/MR) device and be implemented as a head-mounted device (HMD), a head-up display (HUD) mounted in vehicles, a television (TV), a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smart meter. For example, the network and BSs may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may include a 3G network, a 4G (e.g., LTE) network, or a 5G (e.g., NR) network. Although the wireless devices 100a to 100f may communicate with each other through the BSs/network 200/300, the wireless devices 100a to 100f may perform direct communication (e.g., sidelink communication) with each other without assistance from the BSs/network 200/300. For example, the vehicles 100b-1 and 100b-2 may perform direct communication (e.g. vehicle-to-vehicle/vehicle-to-everything (V2V/V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and BSs 200 or between one BS 200 and another BS 200. Herein, the wireless communication/connections may be established through various radio access technologies (e.g., 5G NR) such as UL/DL communication 150a, sidelink communication 150b (or device-to-device (D2D) communication), or inter-BS communication (e.g. relay, integrated access backhaul (IAB), etc.). The wireless devices and BSs may transmit/receive radio signals to/from each other through the wireless communication/connections 150a to 150c. For example, signals may be transmitted/received over various physical channels for the wireless communication/connections 150a to 150c. To this end, at least a part of various configuration information configuring processes, signal processing processes (e.g., channel encoding/decoding, modulation/demodulation, resource mapping/demapping, etc.), and resource allocating processes for radio signal transmission/reception may be performed based on various proposals of the present disclosure.

Figure 25:
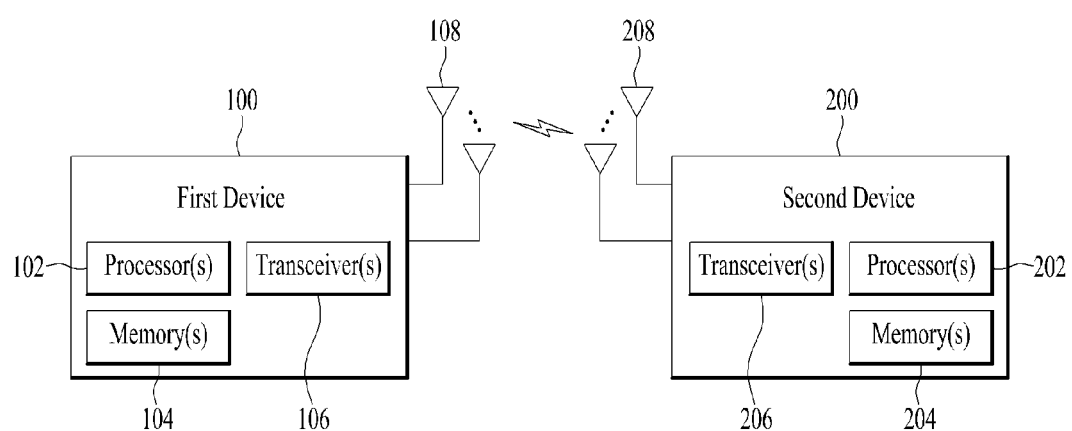
FIG. 25 illustrates other exemplary wireless devices to which various embodiments of the present disclosure are applied.

4.2.1 Example of Wireless Devices to which Various Embodiments of the Present Disclosure are Applied FIG. 25 illustrates exemplary wireless devices to which various embodiments of the present disclosure are applicable.

Referring to FIG. 25, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 24.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 26:
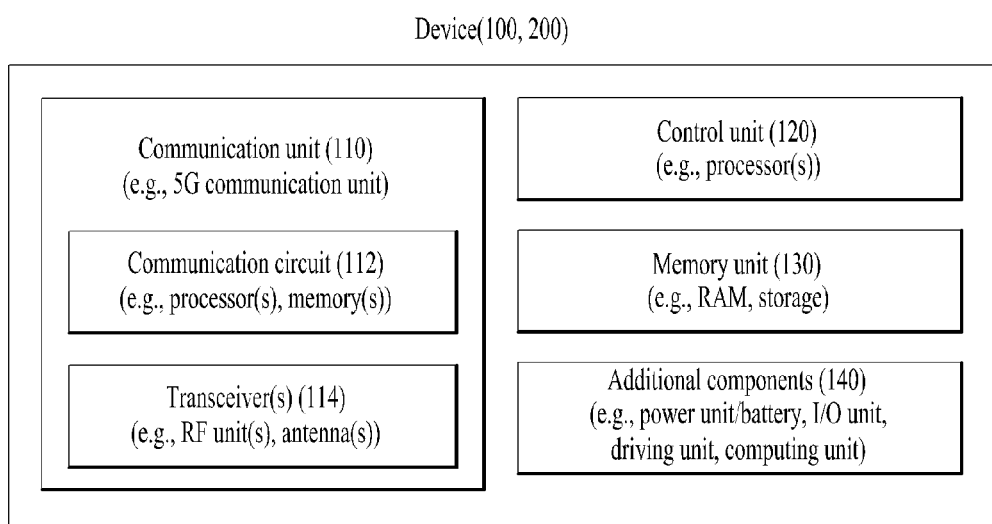
FIG. 26 illustrates an exemplary portable device to which various embodiments of the present disclosure are applied.

4.2.2. Example of Using Wireless Devices to which Various Embodiments of the Present Disclosure are Applied FIG. 26 illustrates other exemplary wireless devices to which various embodiments of the present disclosure are applied. The wireless devices may be implemented in various forms according to a use case/service (see FIG. 24).

Referring to FIG. 26, wireless devices 100 and 200 may correspond to the wireless devices 100 and 200 of FIG. 25 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 25. For example, the transceiver(s)$^{114}$ may include the one or more transceivers 106 and 206 and/or the one or more antennas 108 and 208 of FIG. 25. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 24), the vehicles (100b-1 and 100b-2 of FIG. 24), the XR device (100c of FIG. 24), the hand-held device (100d of FIG. 24), the home appliance (100e of FIG. 24), the IoT device (100f of FIG. 24), a digital broadcast terminal, a hologram device, a public safety device, an MTC device, a medicine device, a Fintech device (or a finance device), a security device, a climate/environment device, the AI server/device (400 of FIG. 24), the BSs (200 of FIG. 24), a network node, etc. The wireless device may be used in a mobile or fixed place according to a use-example/service.

In FIG. 26, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 26 will be described in detail with reference to the drawings.

Figure 27:
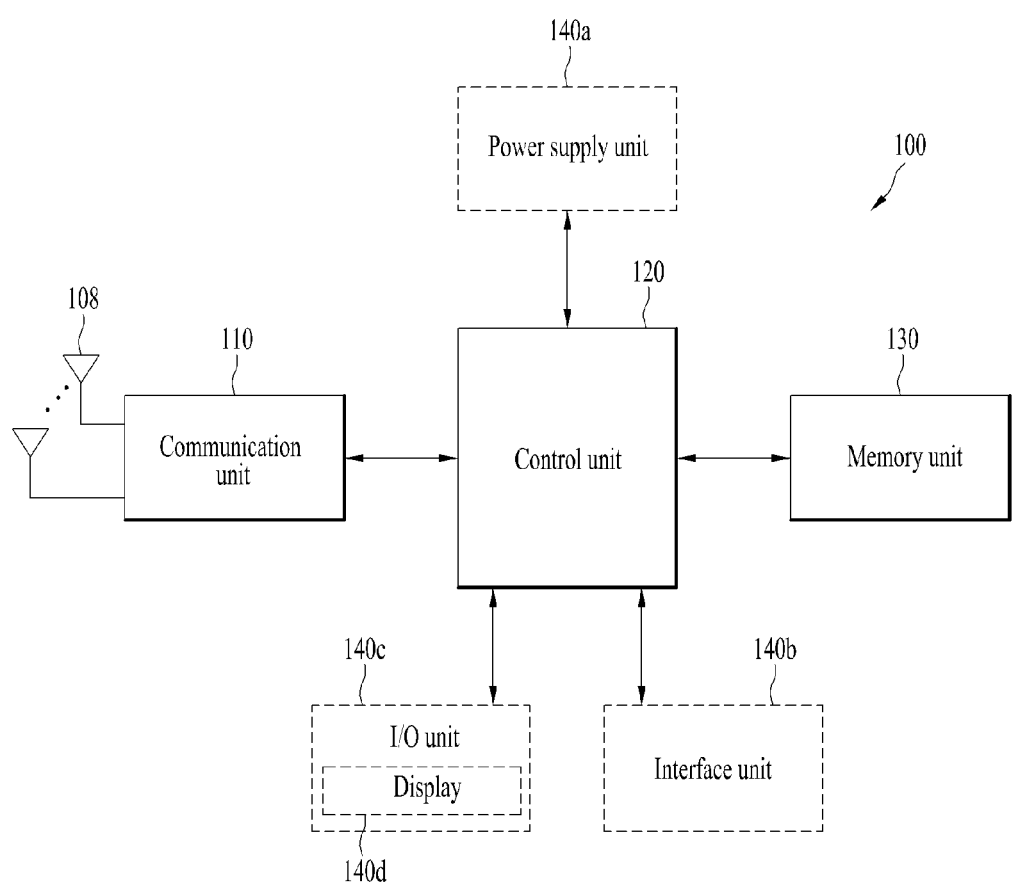
FIG. 27 illustrates an exemplary vehicle or autonomous driving vehicle to which various embodiments of the present disclosure.

4.2.3. Example of Portable Device to which Various Embodiments of the Present Disclosure are Applied FIG. 27 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 27, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 26, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 28:
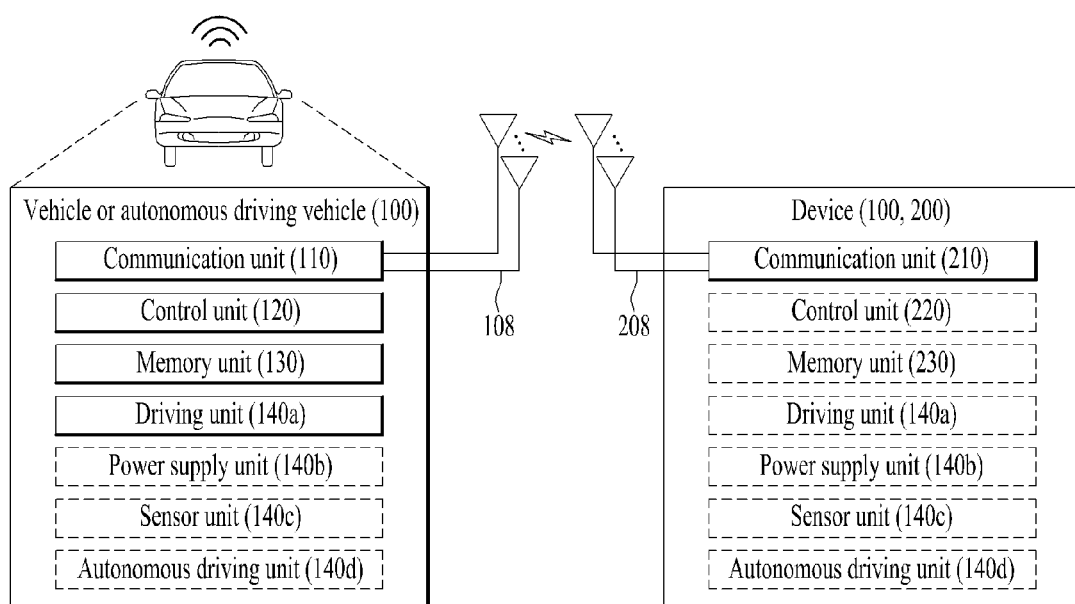
FIG. 28 illustrates an exemplary vehicle to which various embodiments of the present disclosure are applied.

FIG. 28 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 26, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi-mode multi-band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Wireless communication technologies in which various embodiments of the present disclosure are implemented may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices according to various embodiments of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices according to various embodiments of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments of present disclosure are applicable to various wireless access systems. Examples of the various wireless access systems include a 3GPP system or a 3GPP2 system. Besides these wireless access systems, the various embodiments of the present disclosure are applicable to all technical fields in which the wireless access systems find their applications. Moreover, the proposed methods are also applicable to an mmWave communication system using an ultra-high frequency band.

The invention claimed is:

1. A method performed by a user equipment (UE) in a wireless communication system, the method comprising:
   receiving first information related to a positioning reference signal (PRS) configuration; and
   receiving a PRS mapped to resource elements (REs),
   wherein the REs are determined based on: (i) a resource element offset for a frequency domain, (ii) a frequency offset for the frequency domain, and (iii) a comb size for the frequency domain,
   wherein the first information comprises second information related to the resource element offset, and
   wherein the frequency offset is determined based on: (i) a symbol number of symbol included in symbols for the REs in a time domain and (ii) the comb size.

2. The method of claim 1, wherein the frequency offset, the symbol number and the comb size satisfy a predefined corresponding relation.

3. The method of claim 1, wherein, based on the symbol number being 0, the frequency offset is determined as 0 for all of a plurality of candidate values for the comb size, and
   wherein the plurality of candidate values are 2, 4, 6, and 8.

4. The method of claim 1, wherein, based on the comb size being 4 and a number of symbols is 4:
   the frequency offset for the symbol number being 0 is determined as 0,
   the frequency offset for the symbol number being 1 is determined as 2,
   the frequency offset for the symbol number being 2 is determined as 1, and
   the frequency offset for the symbol number being 3 is determined as 3.

5. A user equipment (UE) configured to operate in a wireless communication system, the UE comprising:

a transceiver; and
at least one processor coupled with the transceiver,
wherein the at least one processor is configured to:
receive first information related to a positioning reference signal (PRS) configuration; and
receive a PRS mapped to resource elements (REs),
wherein the REs are determined based on: (i) a resource element offset for a frequency domain, (ii) a frequency offset for the frequency domain, and (iii) a comb size for the frequency domain,
wherein the first information comprises second information related to the resource element offset, and
wherein the frequency offset is determined based on: (i) a symbol number of symbol included in symbols for the REs in a time domain and (ii) the comb size.

6. A method performed by a base station in a wireless communication system, the method comprising:
transmitting first information related to a positioning reference signal (PRS) configuration; and
transmitting a PRS mapped to resource elements (REs),
wherein the REs are determined based on: (i) a resource element offset for a frequency domain, (ii) a frequency offset for the frequency domain, and (iii) a comb size for the frequency domain,
wherein the first information comprises second information related to the resource element offset, and
wherein the frequency offset is determined based on: (i) a symbol number of symbol included in symbols for the REs in a time domain and (ii) the comb size.

7. A base station configured to operate in a wireless communication system, the base station comprising:
a transceiver; and
at least one processor coupled with the transceiver,
wherein the at least one processor is configured to:
transmit first information related to a positioning reference signal (PRS) configuration; and
transmit a PRS mapped to resource elements (REs),
wherein the REs are determined based on: (i) a resource element offset for a frequency domain, (ii) a frequency offset for the frequency domain, and (iii) a comb size for the frequency domain,
wherein the first information comprises second information related to the resource element offset, and
wherein the frequency offset is determined based on: (i) a symbol number of symbol included in symbols for the REs in a time domain and (ii) the comb size.

\* \* \* \* \*